US011111865B2

(12) United States Patent
Hikitani et al.

(10) Patent No.: US 11,111,865 B2
(45) Date of Patent: Sep. 7, 2021

(54) COMPRESSION IGNITION ENGINE WITH SUPERCHARGER

(71) Applicant: Mazda Motor Corporation, Hiroshima (JP)

(72) Inventors: Shinichi Hikitani, Hiroshima (JP); Hajime Umehara, Hiroshima (JP); Naoki Nagano, Hiroshima (JP); Tomokuni Kusunoki, Aki-gun (JP); Tatsuya Takahata, Hiroshima (JP); Shinji Watanabe, Hiroshima (JP); Masanobu Koutoku, Higashihiroshima (JP); Toshinori Ueno, Highashihiroshima (JP); Katsuya Murakami, Hiroshima (JP); Nobuhiko Yokoyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/675,508

(22) Filed: Nov. 6, 2019

(65) Prior Publication Data
US 2020/0208582 A1 Jul. 2, 2020

(30) Foreign Application Priority Data
Dec. 26, 2018 (JP) ............................ JP2018-241984

(51) Int. Cl.
*F02D 41/00* (2006.01)
*B60K 11/08* (2006.01)
(Continued)

(52) U.S. Cl.
CPC .......... *F02D 41/0007* (2013.01); *B60K 11/08* (2013.01); *F01P 3/18* (2013.01);
(Continued)

(58) Field of Classification Search
CPC . F02D 41/0007; F02D 41/3041; B60K 11/08; F01P 3/18; F01P 5/02; F01P 7/00;
(Continued)

(56) References Cited

U.S. PATENT DOCUMENTS 5,133,326 A * 7/1992 Nishimura ............ F02B 33/443
123/559.3
7,912,599 B2 * 3/2011 Eiraku ...................... F01P 5/04
701/34.4
(Continued)

FOREIGN PATENT DOCUMENTS

CN 203626940 U * 6/2014
JP 03233128 A * 10/1991 ................ F01P 3/18
(Continued)

OTHER PUBLICATIONS

European Patent Office, Extended European Search Report Issued in Application No. 19218517.1, dated May 18, 2020, Germany, 8 pages.

*Primary Examiner* — Jacob M Amick
*Assistant Examiner* — Charles J Brauch
(74) *Attorney, Agent, or Firm* — Alleman Hall Creasman & Tuttle LLP

(57) ABSTRACT

A compression ignition engine with a supercharger is provided, which includes one or more valves configured to switch a state between a first state where intake air is boosted by the supercharger and a second state where it is not boosted, a fluid temperature adjuster configured to adjust a temperature of engine coolant to be supplied to a radiator from an engine body, and a controller. When the engine operates in a high-load range, the controller controls the combustion mode to be in a compression ignition combustion mode, and causes the valve(s) to be in the first state, and in a low-load range, the controller causes the valve(s) to be in the second state. In the high-load range, the controller
(Continued)

outputs a control signal to the fluid temperature adjuster so that a target temperature of the engine coolant is lowered than that in the low-load range.

10 Claims, 10 Drawing Sheets

(51) Int. Cl.
*F01P 3/18* (2006.01)
*F01P 5/02* (2006.01)
*F01P 7/00* (2006.01)
*F02B 1/12* (2006.01)
*F02B 37/16* (2006.01)
*F02B 37/18* (2006.01)

(52) U.S. Cl.
CPC ...... *F01P 5/02* (2013.01); *F01P 7/00* (2013.01); *F02B 1/12* (2013.01); *F02B 37/16* (2013.01); *F02B 37/183* (2013.01)

(58) Field of Classification Search
CPC ........ F01P 7/048; F01P 2003/185; F01P 7/10; F01P 7/164; F01P 2060/02; F01P 2060/12; F01P 2005/105; F01P 2070/04; F01P 7/167; F02B 1/12; F02B 37/16; F02B 37/183; F02B 37/18; Y02T 10/12; F02M 31/107; F02M 31/10; F02M 31/042

See application file for complete search history.

(56) References Cited

U.S. PATENT DOCUMENTS

| 2004/0035194 A1* | 2/2004 | Wakahara | F01P 11/16 73/114.71 |
| 2013/0125544 A1 | 5/2013 | Mond et al. | |
| 2016/0377004 A1* | 12/2016 | Yokono | F02D 41/0007 701/103 |
| 2018/0038293 A1* | 2/2018 | Wu | F02D 41/0007 |
| 2018/0312053 A1* | 11/2018 | Moro | B60K 11/04 |
| 2018/0334998 A1* | 11/2018 | Inoue | F02B 23/0696 |

FOREIGN PATENT DOCUMENTS

| JP | H11210539 A | 8/1999 |
| JP | 3564989 B2 | 6/2004 |
| JP | 5447435 B2 | 1/2014 |
| WO | 2018096748 A1 | 5/2018 |

* cited by examiner

COMPRESSION IGNITION ENGINE WITH SUPERCHARGER

TECHNICAL FIELD

The present disclosure belongs to a technical field related to a compression ignition engine with a supercharger.

BACKGROUND OF THE DISCLOSURE

For example, JP5447435B2 discloses a compression ignition engine which performs SPCCI (SPark Controlled Compression Ignition) combustion in which an ignition plug performs jump-spark ignition to forcibly ignite a mixture gas inside a combustion chamber to perform flame propagation combustion (spark ignition (SI) combustion), and as the temperature inside the combustion chamber increases by the generation of heat due to the flame propagation combustion, unburnt mixture gas is self-ignited at a stretch and combusted (compression ignition (CI) combustion).

Moreover, for example, JP3564989B2 discloses an engine with a supercharger, which is provided with a mechanical supercharger in an intake passage. This boosted engine includes, in addition to the mechanical supercharger, a clutch (electromagnetic clutch) which connects and disconnects the transmission of a driving force from an output shaft of an engine body to the mechanical supercharger, and an air bypass passage which bypasses the mechanical supercharger and a bypass control valve which opens and closes the air bypass passage, which are provided in the intake passage. In JP3564989B2, when the operating state of the boosted engine is in a high-load range, the clutch is turned on to allow the transmission of the driving force to the mechanical supercharger and the bypass control valve is closed so that the intake air to the combustion chamber of the engine body is boosted. On the other hand, when the operating state of the boosted engine is in a low-load low-speed range, the clutch is turned off and the bypass control valve is opened so that the boosting of the intake air to the combustion chamber is not performed. Moreover, in JP3564989B2, when the operating state of the boosted engine is in a low-load high-speed range, the clutch is turned on, and the bypass control valve is opened in order not to boost the intake air to the combustion chamber, so that a portion of the intake air compressed by the mechanical supercharger circulates inside the intake passage through a passage where the mechanical supercharger is provided and the air bypass passage and the remaining intake air compressed by the mechanical supercharger is inhaled into the combustion chamber. Thus, the bypass control valve is switched between a closed state in which the boost of the intake air by the mechanical supercharger is enabled if the clutch is on, and an opened state in which the boost of the intake air is disabled even if the clutch is on.

When performing SPCCI (SPark Controlled Compression Ignition) combustion like JP5447435B2, the start timing of compression ignition (CI) combustion is important. That is, after spark ignition (SI) combustion is started near a compression top dead center, it is desirable to start CI combustion, for example, at a timing of 5° to 10° by a crank angle after the compression top dead center. If the start timing of CI combustion is too early and becomes too close to the compression top dead center, especially when the engine load is high, since the pressure and the temperature inside the combustion chamber increase abruptly by CI combustion in the state where the pressure and the temperature inside the combustion chamber have already been high, combustion noise increases or a NOx generated amount (raw NOx generated amount) inside the combustion chamber increases. On the other hand, if the start timing of CI combustion is too late, since a thrust caused by CI combustion acts on the top part of a piston at a position where the piston descended considerably from the compression top dead center, the engine output torque may not fully be acquired or fuel efficiency may be lowered.

However, when the engine load is high, since the temperature inside the combustion chamber at a compression top dead center becomes too high, the start timing of CI combustion tends to become too early. Especially, in the boosted engine provided with the mechanical supercharger like JP3564989B2 or a turbocharger, the start timing of CI combustion becomes further earlier in order to boost the intake air when the load is high, a possibility that combustion noise increases or the raw NOx generated amount increases becomes higher.

SUMMARY OF THE DISCLOSURE

The present disclosure is made in view of the above situations, and one purpose thereof is to provide a compression ignition engine with a supercharger which boosts when the load is high and performs SPCCI combustion. The engine prevents an increase of combustion noise and an increase of a raw NOx generated amount when the load is high, and prevents a reduction of output torque and a lowering of fuel efficiency.

According to one aspect of the present disclosure, a compression ignition engine with a supercharger is provided, which includes an engine body having a cylinder where a combustion chamber is formed, the supercharger, configured to boost intake air to the combustion chamber of the engine body, one or more valves configured to switch a state between a first state in which the intake air is boosted by the supercharger and a second state in which the intake air is not boosted by the supercharger, a fluid temperature adjuster configured to adjust a temperature of engine coolant configured to be supplied to a radiator from the engine body to cool the engine body, and a controller comprised of circuitry, configured to control operation of the engine body including operations of the one or more valves and the fluid temperature adjuster. When the controller determines that an operating state of the engine body is in a high-load operating range where an engine load is more than a given load, the controller controls the combustion mode to be in a compression ignition combustion mode in which an unburnt mixture gas is self-ignited during flame propagation combustion of a mixture gas caused by jump-spark ignition inside the combustion chamber. When the controller determines that the operating state of the engine body is in the high-load operating range, causing the one or more valves to be in the first state, while when the operating state of the engine body is in a low-load operating range in which the load is lower than the given load, causing the one or more valves to be in the second state. When the controller determines that the operating state of the engine body is in the high-load operating range, the controller outputs a control signal to the fluid temperature adjuster so that a target temperature of the engine coolant is lowered, compared with the case when the operating state of the engine body is in the low-load operating range.

According to this configuration, when the operating state of the engine body is in the high-load operating range in which the temperature inside the combustion chamber becomes higher at the compression top dead center more easily compared with in the low-load operating range, the target temperature of the engine coolant configured to be supplied to a radiator from the engine body is lowered compared with the case when the operating state of the engine body is in the low-load operating range. Thus, when the operating state of the engine body is in the high-load operating range, the temperature inside the combustion chamber at the compression top dead center can be prevented from becoming too high. As a result, at a suitable timing after spark ignition (SI) combustion (desirably, 5° to 10° by the crank angle after the compression top dead center), compression ignition (CI) combustion starts. Therefore, when the operating state of the engine body is in the high-load operating range, since the start timing of CI combustion is prevented from becoming too close to the compression top dead center, an increase of combustion noise and an increase of raw NOx generated amount are prevented, and since CI combustion is started at the suitable timing, a reduction of output torque and a lowering of fuel efficiency can be prevented.

The fluid temperature adjuster may have an air amount adjuster configured to adjust an amount of air passing through the radiator. When the operating state of the engine body is in the high-load operating range, the controller may increase the amount of the air adjusted by the air amount adjuster, compared with the case when the operating state of the engine body is in the low-load operating range.

According to this configuration, when the operating state of the engine body is in the high-load operating range, the temperature inside the combustion chamber at the compression top dead center can easily and effectively be prevented from becoming too high. Thus, CI combustion starts at a suitable timing after SI combustion.

The supercharger may be a mechanical supercharger disposed in an intake passage connected to the engine body.

In a case where the supercharger is the mechanical supercharger, the intake passage may be provided with a bypass passage bypassing the mechanical supercharger. The compression ignition engine may further include a clutch configured to intercept and permit transmission of a driving force to the mechanical supercharger, and the one or more valves may include an air bypass valve configured to open and close the bypass passage.

According to this configuration, when the clutch is connected and the air bypass valve is closed, the one or more valves are considered to be in the first state, on the other hand, when the clutch is connected or disconnected and the air bypass valve is opened, the one or more valves are considered to be in the second state. Thus, the one or more valves are easily configured in the case where the supercharger is the mechanical supercharger.

The supercharger may be a turbocharger having a turbine disposed in an exhaust passage connected to the engine body, and a compressor disposed in the intake passage connected to the engine body and configured to be driven by the turbine.

In a case where the supercharger is the turbocharger, the exhaust passage may be provided with a turbine bypass passage bypassing the turbine, and the intake passage may be provided with a compressor bypass passage bypassing the compressor. The one or more valves may include a waste gate valve configured to open and close the turbine bypass passage, and a compressor bypass valve configured to open and close the compressor bypass passage.

According to this configuration, when the waste gate valve is closed and the compressor bypass valve is closed, the one or more valves are considered to be in the first state, on the other hand, when the waste gate valve is opened or closed and the compressor bypass valve is opened, the one or more valves are considered to be in the second state. Thus, the one or more valves are easily configured in the case where the supercharger is the turbocharger.

DETAILED DESCRIPTION OF THE DISCLOSURE

Hereinafter, one embodiment of the present disclosure is described in detail based on the accompanying drawings.

Figure 1:
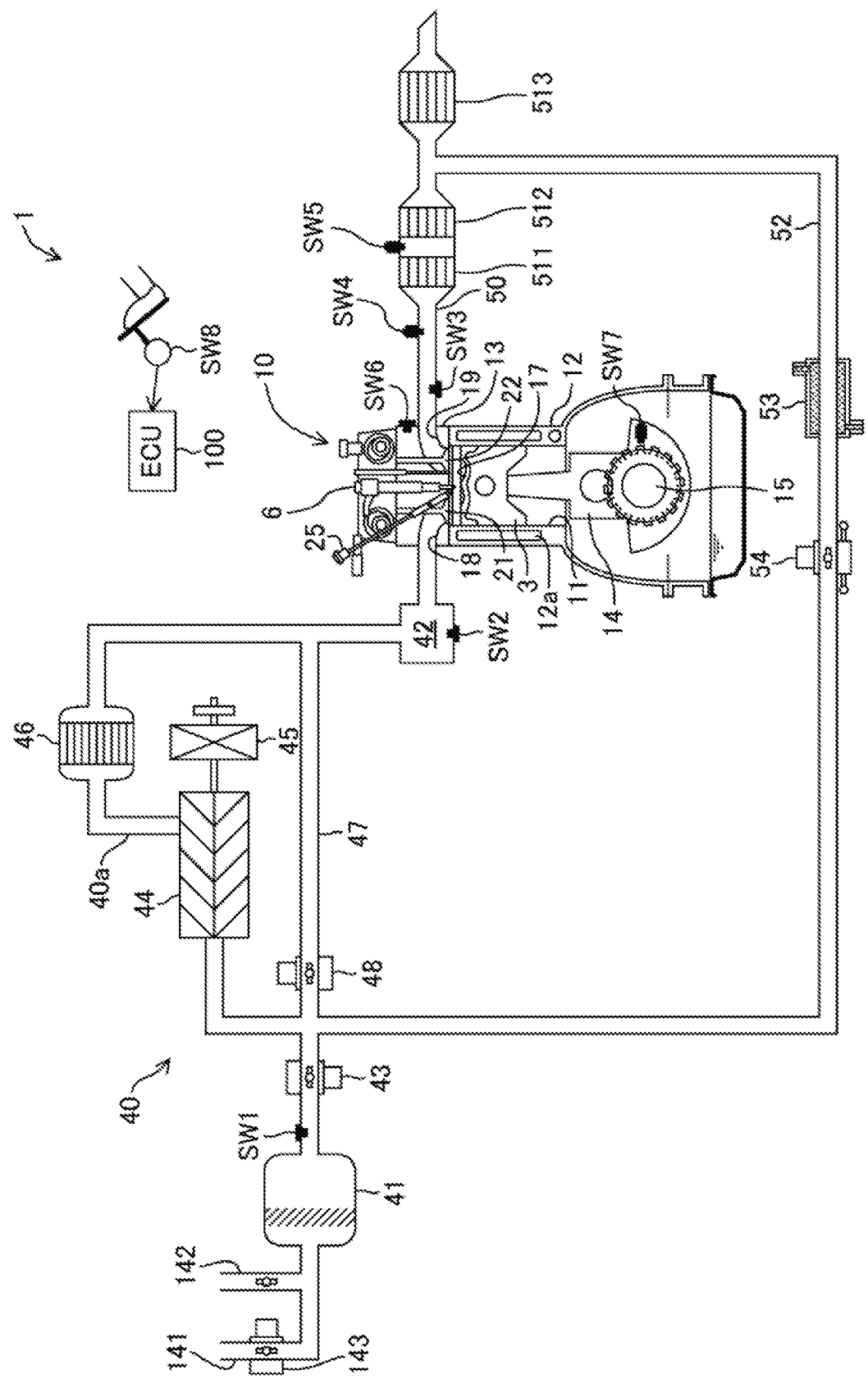
FIG. 1 is an outline view of a compression ignition engine with a supercharger according to one embodiment of the present disclosure.

FIG. 1 illustrates a configuration of a compression ignition engine 1 with a supercharger according to this embodiment (hereinafter, simply referred to as "the engine 1"). The engine 1 is a four-stroke engine which operates by a combustion chamber 17 repeating an intake stroke, a compression stroke, an expansion stroke, and an exhaust stroke. The engine 1 is mounted on a vehicle (here, an automobile) with four wheels. The vehicle is propelled by the engine 1 (in detail, an engine body 10 described later). Fuel of the engine 1 is liquid fuel of which the main component is gasoline in this embodiment, i.e., the engine 1 is a gasoline engine.

(Configuration of Engine)

The engine 1 is provided with the engine body 10 having a cylinder block 12 and a cylinder head 13 placed thereon and arranged in an engine bay of the vehicle. A plurality of cylinders 11 are formed inside the cylinder block 12 of the engine body 10 (in FIG. 1, only one cylinder 11 is illustrated). The plurality of cylinders 11 of the engine body 10 are lined up in a direction perpendicular to the drawing sheet surface of FIG. 1. That is, the engine 1 is an in-line multiple cylinder engine.

A piston 3 is slidably inserted in each cylinder 11. The piston 3 is coupled to a crankshaft 15 through a connecting rod 14. The piston 3 defines the combustion chamber 17 together with the cylinder 11 and the cylinder head 13. Note that the "combustion chamber" is not limited to a space thereof when the piston 3 is located at a compression top dead center. Therefore, the term "combustion chamber" may be used in a broader sense. That is, the "combustion chamber" may mean the space formed by the piston 3, the cylinder 11, and the cylinder head 13, regardless of the position of the piston 3.

A water jacket 12a is formed in the perimeter of each cylinder 11 in the cylinder block 12. Engine coolant which cools the engine body 10 circulates inside the water jacket 12a. Although detailed illustration is omitted, after passing through the water jacket 12a, the engine coolant passes through a water jacket formed in the cylinder head 13, and flows out of the engine body 10.

An intake port 18 is formed in the cylinder head 13 for every cylinder 11. The intake port 18 communicates with the combustion chamber 17. An intake valve 21 is disposed in the intake port 18. The intake valve 21 opens and closes an intake passage between the combustion chamber 17 and the intake port 18. The intake valve 21 is opened and closed at a given timing by a valve operating mechanism. The valve operating mechanism may be a variable valve operating mechanism which varies a valve timing and/or a valve lift. In this embodiment, the variable valve operating mechanism has an intake electric S-VT (Sequential-Valve Timing) 23 (refer to FIG. 4). The intake electric S-VT 23 is configured to continuously change a rotation phase of an intake camshaft within a given angle range. Therefore, an open timing and a close timing of the intake valve 21 are continuously changed. Note that the intake valve operating mechanism may have a hydraulic S-VT, instead of the electric S-VT.

An exhaust port 19 is formed in the cylinder head 13 for every cylinder 11. The exhaust port 19 communicates with the combustion chamber 17. An exhaust valve 22 is disposed in the exhaust port 19. The exhaust valve 22 opens and closes an exhaust passage between the combustion chamber 17 and the exhaust port 19. By the valve operating mechanism, the exhaust valve 22 is opened and closed at a given timing. This valve operating mechanism may be a variable valve operating mechanism which varies a valve timing and/or a valve lift. In this embodiment, the variable valve operating mechanism has an exhaust electric S-VT 24 (refer to FIG. 4). The exhaust electric S-VT 24 is configured to continuously change a rotation phase of an exhaust camshaft within a given angle range. Thus, an open timing and a close timing of the exhaust valve 22 are changed continuously. Note that the exhaust valve operating mechanism may have a hydraulic S-VT, instead of the electric S-VT.

An injector 6 which directly injects fuel into the cylinder 11 is attached to the cylinder head 13 for every cylinder 11. The injector 6 is disposed so that its nozzle holes face the combustion chamber 17 from a center part of a ceiling surface of the combustion chamber 17 (in detail, a part slightly at the exhaust side from the center). The injector 6 directly injects an amount of fuel according to the operating state of the engine body 10 into the combustion chamber 17 at an injection timing set according to the operating state of the engine body 10.

An ignition plug 25 is attached to the cylinder head 13 for every cylinder 11. The ignition plug 25 forcibly ignites a mixture gas inside the combustion chamber 17. In this embodiment, the ignition plug 25 is disposed at the intake side. Electrodes of the ignition plug 25 face the inside of the combustion chamber 17, and are located near the ceiling surface of the combustion chamber 17. Note that the ignition plug 25 may be disposed at the exhaust side. Moreover, while disposing the ignition plug 25 on the center axis of the cylinder 11, the injector 6 may be disposed at the intake side or the exhaust side of the center axis of the cylinder 11.

In this embodiment, the geometric compression ratio of the engine body 10 is set as 13:1 or more and 30:1 or less. As will be described later, in the entire operating range after a warm-up of the engine body 10, the combustion mode of the engine body 10 is in a compression ignition combustion mode in which an unburnt mixture gas is self-ignited during flame propagation combustion of the mixture gas caused by a jump-spark ignition inside the combustion chamber 17. That is, the engine body 10 performs SPCCI (SPark Controlled Compression Ignition) combustion in which the ignition plug 25 performs jump-spark ignition to perform SI (Spark Ignition) combustion, and as the temperature inside the combustion chamber 17 increases by the generation of heat due to SI combustion, the unburnt mixture gas is self-ignited to perform CI (Compression Ignition) combustion. SPCCI combustion controls a start timing of CI combustion by utilizing a generation of heat and a pressure buildup by SI combustion. Note that the geometric compression ratio of the engine body 10 may be set as 14:1 to 17:1 in a regular gasoline specification (the octane number of fuel is about 91), and may also be set as 15 to 18 in a high-octane specification (the octane number of fuel is about 96).

Figure 2:
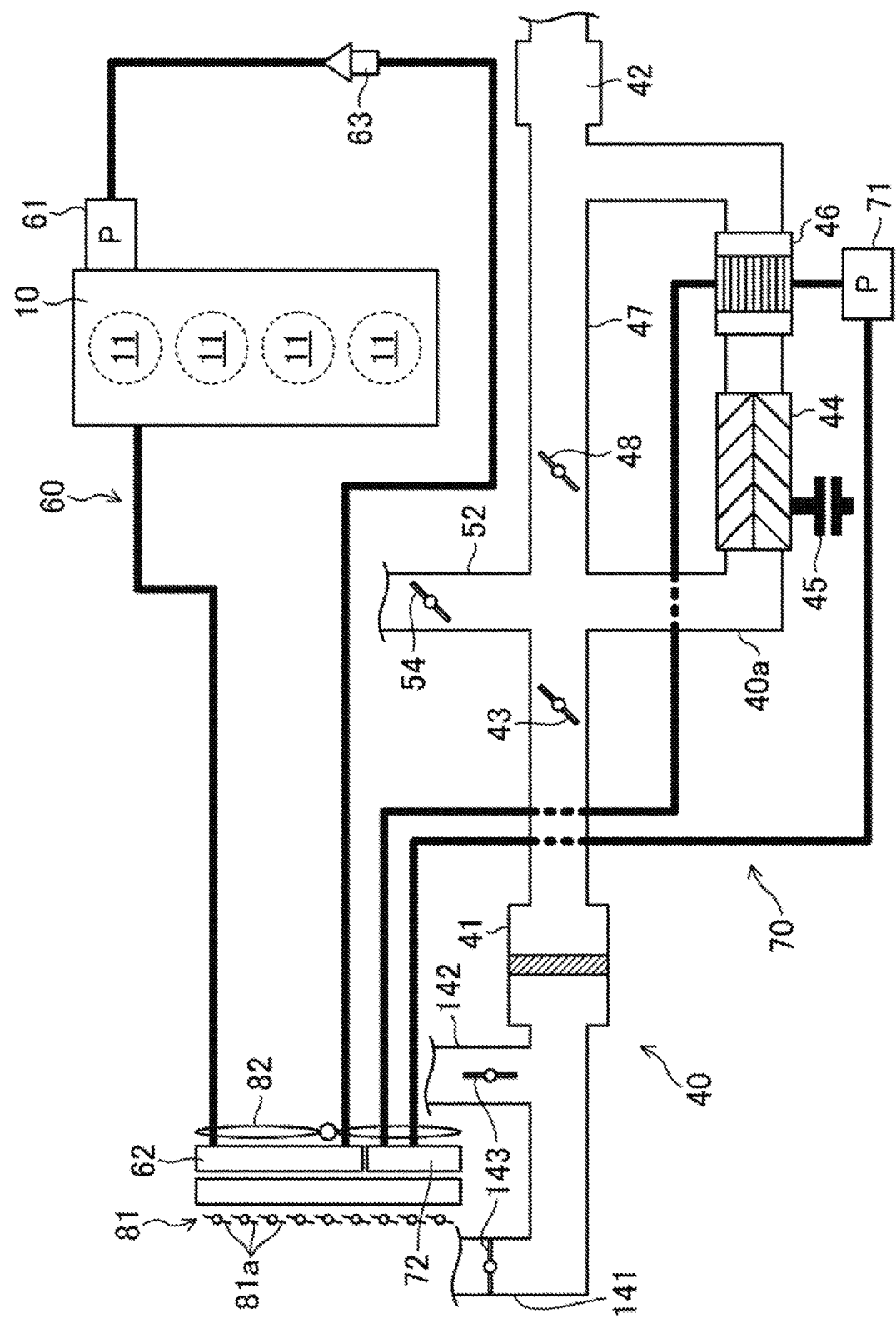
FIG. 2 is a view schematically illustrating a part of a cooling system of the engine.

An intake passage 40 is connected to one side of the engine body 10. The intake passage 40 communicates with the intake port 18 of each cylinder 11. The intake passage 40 is a passage through which intake air introduced into the combustion chamber 17 circulates. As illustrated in FIGS. 1 and 2, the intake passage 40 according to this embodiment has a first air intake part 141 which takes in fresh air at the same temperature as the ambient temperature, and the second air intake part 142 which takes in fresh air at a temperature higher than the ambient temperature. The configurations of the air intake parts 141 and 142 will be described later.

An air cleaner 41 which filters the fresh air is disposed in the intake passage 40 at a part immediately downstream of both the air intake parts 141 and 142. A surge tank 42 is disposed near the downstream end of the intake passage 40. A part of the intake passage 40 downstream of the surge tank 42 constitutes independent passages branched for every cylinder 11. The downstream end of each of the independent passage is connected to the intake port 18 of each cylinder 11.

A throttle valve 43 is disposed between the air cleaner 41 and the surge tank 42 in the intake passage 40. The throttle valve 43 varies an opening of a valve to adjust an amount of fresh air introduced into the combustion chamber 17.

A supercharging side passage 40a where a compressor of a mechanical supercharger 44 (hereinafter, simply referred to as the "supercharger 44") is disposed downstream of the throttle valve 43 is provided in the intake passage 40. The supercharger 44 boosts intake air introduced into the combustion chamber 17. In this embodiment, the supercharger 44 is a supercharger which is driven by the engine body 10 (the crankshaft 15 which is the output shaft of the engine body 10). The supercharger 44 may be a Lysholm type, for example. The configuration of the supercharger 44 is not limited in particular. The supercharger 44 may also be a root type, a vane type, or a centrifugal type.

An electromagnetic clutch 45 is provided between the supercharger 44 and the engine body 10 (crankshaft 15). The electromagnetic clutch 45 transmits a driving force from the engine body 10 to the supercharger 44, or intercepts the transmission of the driving force between the supercharger 44 and the engine body 10. As will be described later, an ECU 100 switches the disconnection (interception) and the connection (transmission) of the electromagnetic clutch 45 to switch the supercharger 44 between a driving state and a non-driving state. That is, the electromagnetic clutch 45 is a clutch which switches the driving and the non-driving of the supercharger 44.

An intercooler 46 is disposed immediately downstream of the supercharger 44 in the supercharging side passage 40*a*. The intercooler 46 cools intake air compressed by the supercharger 44. In this embodiment, the intercooler 46 is cooled by intercooler coolant. Although the detail will be described later, the intercooler coolant is coolant different from the engine coolant.

A bypass passage 47 is connected to the intake passage 40. The bypass passage 47 connects a part of the intake passage 40 (supercharging side passage 40*a*) upstream of the supercharger 44 to a part downstream of the intercooler 46 so as to bypass the supercharger 44 and the intercooler 46. An air bypass valve 48 which opens and closes the bypass passage 47 is disposed in the bypass passage 47. In this embodiment, the air bypass valve 48 is an on-off valve.

When the supercharger 44 is not driven (i.e., when the electromagnetic clutch 45 is disconnected), the air bypass valve 48 is made into an open state (ON state). Therefore, gas which flows through the intake passage 40 bypasses the supercharger 44, and is introduced into the combustion chamber 17 of the engine body 10. The engine 1 is operated in a non-boosted state (i.e., natural aspirated state).

When the supercharger 44 is driven (i.e., when the electromagnetic clutch 45 is connected) while the air bypass valve 48 is opened, intake air flows into the supercharging side passage 40*a* after passing through the throttle valve 43. A portion of the intake air which passed through the supercharger 44 flows back to the upstream side of the supercharger 44 through the bypass passage 47 (the portion of the intake air is recirculated). At this time, an amount of intake air according to the engine specification (rest of the intake air passing through the supercharger 44) is introduced into the combustion chamber 17 of the engine body 10, similar to the non-driving state of the supercharger 44. Therefore, even if the supercharger 44 is driven, intake air can be introduced into the combustion chamber 17 in the non-boosted state. Note that the phrase "when supercharging or boosting" as used herein refers to a case where the pressure inside the surge tank 42 exceeds the atmospheric pressure, and the phrase "when not supercharging or not boosting" as used herein refers to a case where the pressure inside the surge tank 42 becomes below the atmospheric pressure.

On the other hand, when the supercharger 44 is driven while the air bypass valve 48 is closed (OFF state), intake air is introduced into the combustion chamber 17 in the boosted state. The amount of intake air at this time is more than an amount of intake air introduced into the combustion chamber 17 in the non-boosted state.

Thus, the air bypass valve 48 may be one example of one or more valves that switch between a first state in which boosting of the intake air by the supercharger 44 is enabled and a second state in which boosting of the intake air by the supercharger 44 is disabled, in conjunction with the electromagnetic clutch 45. Here, the first state is a state where the electromagnetic clutch 45 is connected and the air bypass valve 48 is closed, and the second state is a state where the electromagnetic clutch 45 is connected or disconnected and the air bypass valve 48 is opened. In this embodiment, the air bypass valve 48 can switch between the supercharger 44 in the driving state boosting the intake air introduced into the combustion chamber 17 and the supercharger 44 in the driving state not boosting the intake air introduced into the combustion chamber 17.

Note that the air bypass valve 48 may be comprised of a valve which can continuously vary its opening, without being limited to the on-off valve.

An exhaust passage 50 is connected to the other side of the engine body 10. The exhaust passage 50 communicates with the exhaust port 19 of each cylinder 11. The exhaust passage 50 is a passage through which exhaust gas discharged from the combustion chamber 17 circulates. Although detailed illustration of an upstream part of the exhaust passage 50 is omitted, it is constituted by an exhaust manifold including independent passages branched for every cylinder 11 and a collecting part where the independent passages are collected. The upstream end of the independent passage is connected to the exhaust port 19 of each cylinder 11.

An exhaust gas purification system having a plurality of catalytic converters (upstream and downstream catalytic converters) is disposed in the exhaust passage 50. Although illustration of an upstream catalytic converter is omitted, it is disposed in the engine bay. The upstream catalytic converter has a three-way catalyst 511 and a GPF (Gasoline Particulate Filter) 512. A downstream catalytic converter is disposed outside the engine bay. The downstream catalytic converter has a three-way catalyst 513. Note that the exhaust gas purification system is not limited to the illustrated configuration. For example, the GPF may be omitted. Moreover, the upstream and downstream catalytic converters are not limited to those having the three-way catalyst. Further, the disposed order of the three-way catalysts 511 and 513 and the GPF 512 may be change suitably.

An exhaust gas recirculation (EGR) passage 52 which constitutes an external EGR system is connected between the intake passage 40 and the exhaust passage 50. The EGR passage 52 is a passage which recirculates a portion of exhaust gas to the intake passage 40. The upstream end of the EGR passage 52 is connected to the exhaust passage 50 between the upstream catalytic converter and the downstream catalytic converter. The downstream end of the EGR passage 52 is connected to the intake passage 40 at a location upstream of the supercharger 44. Exhaust gas which flows through the EGR passage 52 (hereinafter, referred to as the "EGR gas") enters into the intake passage 40 upstream of the supercharger 44, without passing through the air bypass valve 48 of the bypass passage 47, when introduced into the supercharging side passage 40*a* of the intake passage 40.

An EGR cooler 53 of a fluid cooling type is disposed in the EGR passage 52. The EGR cooler 53 cools the EGR gas passing through the EGR passage 52. An EGR valve 54 is disposed in the EGR passage 52. The EGR valve 54 is comprised of a valve which can continuously vary the valve opening and configured to adjust a flow rate of the EGR gas which flows through the EGR passage 52. By varying the opening of the EGR valve 54, a recirculating amount of the cooled EGR gas can be adjusted. The EGR valve 54 may be comprised of an on-off valve.

(Cooling System of Engine)

Next, a cooling system of the engine 1 is described. As illustrated in FIG. 2, the cooling system of the engine 1 includes a first cooling path 60 which cools the engine body 10 by circulating the engine coolant in the engine body 10, and a second cooling path 70 which cools intake air after passing through the supercharger 44 by circulating the intercooler coolant in the intercooler 46.

The first cooling path 60 is provided with a first pump 61, a first radiator 62 configured to cool the engine coolant which flows through the first cooling path 60, and a flow rate control valve 63 which adjusts a temperature and a flow rate of the engine coolant circulating through the first cooling path 60.

The first pump 61 is a mechanical pump which is driven by the crankshaft 15 of the engine body 10 in an interlocked manner. A discharge port of the first pump 61 is connected to the water jacket 12a of the cylinder block 12 of the engine body 10.

The first radiator 62 cools the engine coolant which passes through the water jacket 12a of the cylinder block 12 and the water jacket of the cylinder head 13 and is discharged from the cylinder head 13. The first radiator 62 cools the engine coolant by outside air when a vehicle to which the engine 1 is mounted travels forward.

The flow rate control valve 63 is disposed at an intermediate location of a path through which the engine coolant which is discharged from the first radiator 62 and flows into the first pump 61 passes. That is, the flow rate control valve 63 is disposed at the entrance side into the engine body 10 in the first cooling path 60. In this embodiment, the flow rate control valve 63 is comprised of an electric thermostat valve. In detail, the flow rate control valve 63 is a valve in which a heating wire is built into the thermostat valve. Fundamentally, when the temperature of the engine coolant is above a preset fluid temperature setting, the flow rate control valve 63 is configured to open according to the temperature. However, by applying an electric current to the heating wire, it can open even when the temperature of the engine coolant is below the fluid temperature setting.

Figure 3:
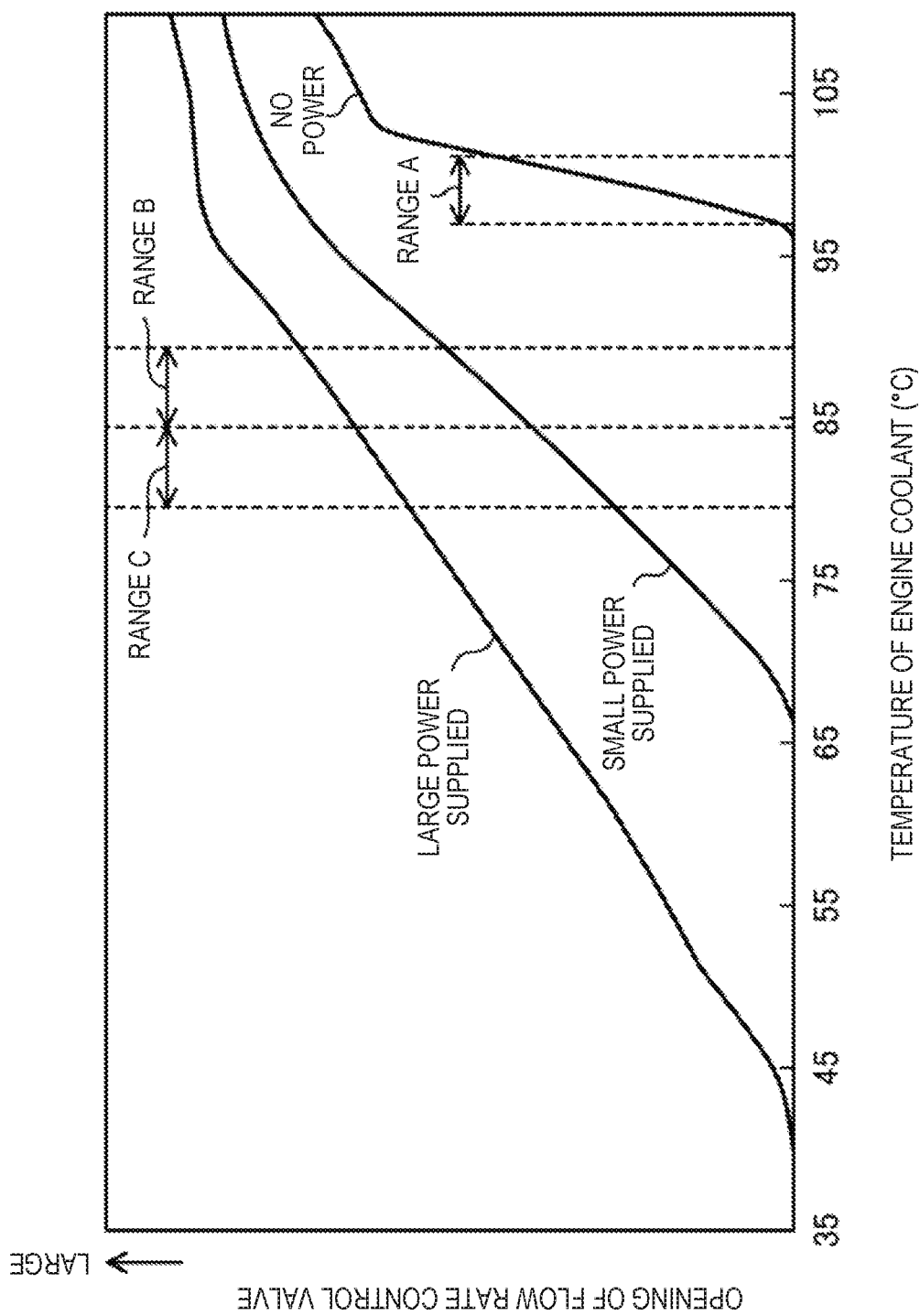
FIG. 3 is a graph illustrating one example of a characteristic of a flow rate control valve to the temperature of engine coolant.

FIG. 3 illustrates one example of a characteristic of the flow rate control valve 63 to the temperature of the engine coolant. In FIG. 3, the temperature of the engine coolant illustrated on the horizontal axis is the temperature at the location of the flow rate control valve 63, and it differs from the temperature of the engine coolant which flows into the first radiator 62. But, the temperature of the engine coolant supplied to the first radiator 62 from the engine body 10 is almost determined by the temperature at the location of the flow rate control valve 63.

As illustrated in FIG. 3, when the power is not supplied, the flow rate control valve 63 begins to open when the temperature of the engine coolant is 95° C. to 96° C. On the other hand, when the power is supplied, it can open even if the temperature of the engine coolant is below 95° C. As illustrated in FIG. 3, the temperature at which the flow rate control valve 63 begins to open is lowered as the current supplied to the heating wire increases. Moreover, the opening of the flow rate control valve 63 while the temperature of the engine coolant is constant can be increased as the current supplied to the heating wire increases, within a range of the opening of the flow rate control valve 63 being smaller than a fully opened state. According to the opening of the flow rate control valve 63, the flow rate of the engine coolant which circulates in the first cooling path 60 (i.e., the flow rate of the engine coolant supplied to the first radiator 62 from the engine body 10) varies. Note that in this embodiment, the fluid temperature setting is set as 95° C. to 96° C.

The power supplied to the flow rate control valve 63 is adjusted based on the operating state of the engine body 10, the ambient temperature, etc. so that the temperature of the engine coolant becomes a suitable temperature.

The flow rate control valve 63 is one example of a fluid temperature adjuster which adjusts the temperature of the engine coolant supplied to the first radiator 62 from the engine body 10.

Note that the flow rate control valve 63 may be, for example, an electromagnetic valve, such as a solenoid valve, instead of the thermostat valve. Since the temperature of the engine coolant cannot be adjusted if the electromagnetic valve is used, a grille shutter 81 and a radiator fan 82, which will be described later, perform the adjustment of the temperature of the engine coolant.

Note that although illustration is omitted, the first cooling path 60 also passes through the EGR cooler 53. That is, the EGR gas passing through the EGR passage 52 is cooled by heat exchange with the engine coolant.

The second cooling path 70 is provided with a second pump 71, and a second radiator 72 which cools the intercooler coolant which flows through the second cooling path 70.

The second pump 71 is an electric pump driven by being supplied with electric power. The second pump 71 is configured to increase a discharging amount of the intercooler coolant as the supplied electric power increases.

The second radiator 72 cools the intercooler coolant discharged from the intercooler 46. In this embodiment, the second radiator 72 is disposed below and adjacent to the first radiator 62. The second radiator 72 cools the intercooler coolant by outside air when the vehicle to which the engine 1 is mounted travels forward. The intercooler coolant cooled by the second radiator 72 flows into the second pump 71.

The cooling system of the engine 1 includes the grille shutter 81 and the radiator fan 82, as a mechanism to send the outside air to the first and second radiators 62 and 72.

The grille shutter 81 is provided to a location of the vehicle forward of the first and second radiators 62 and 72. The grille shutter 81 is comprised of a plurality of flappers 81a which rotate on respective axes extending in the vehicle width direction. The grille shutter 81 is fully opened when the flappers 81a become perpendicular to the vertical direction, and is fully closed when the flappers 81a become substantially parallel to the vertical direction. A flow rate of the air taken into the engine bay, i.e., an amount of air (outside air) which passes the first and second radiators 62 and 72, is adjusted by the angle of the flappers 81a with respect to the vertical direction. The angle of the flappers 81a with respect to the vertical direction (i.e., an opening of the grille shutter 81) is adjustable electrically. Note that the term "vertical direction" as used herein refers to the up-and-down direction of the vehicle and normally corresponds to a direction perpendicular to a road surface. Note that "forward" and "rearward" in the vehicle mean the directions when the vehicle is oriented normally.

The radiator fan 82 is provided rearward of the first and second radiators 62 and 72. The radiator fan 82 draws the outside air by rotating to assist the outside air to flow through the first and second radiators 62 and 72. The radiator fan 82 is configured to increase a drawing amount of the outside air as its rotational speed increases. The radiator fan 82 is configured to be electrically adjustable of the rotational speed.

The outside air taken in through the grille shutter 81 cools the coolant which flows through the first and second radiators 62 and 72 by heat exchange with the coolant. The outside air which passed through the first and second radiators 62 and 72 flows rearward of the radiator fan 82.

The grille shutter 81 and the radiator fan 82 are two examples of a fluid temperature adjuster together with the flow rate control valve 63, and further examples of an air amount adjuster which adjusts an amount of air passes through the first radiator 62.

(Fresh Air Intake Structure of Intake Passage)

As described above, in this embodiment, the intake passage 40 has the two air intake parts comprised of the first and second air intake parts 141 and 142. Roughly illustrated in FIG. 2, the first air intake part 141 is provided forward of the grille shutter 81. The first air intake part 141 takes in the outside air (air not heated) to the intake passage 40. On the other hand, the second air intake part 142 is provided rearward of the radiator fan 82. The second air intake part 142 takes in air (outside air), which passes through the first and second radiators 62 and 72 and flows rearward of the radiator fan 82, to the intake passage 40. That is, air after heat exchange with the coolant which flows through the first and second radiators 62 and 72, is taken in from the second air intake part 142. Thus, the second air intake part 142 takes in air, at a temperature higher than the ambient temperature, to the intake passage 40.

The first and second air intake parts 141 and 142 are provided with an intake air switch valve 143. A valve of the intake air switch valve 143 is disposed at each of the first and second air intake parts 141 and 142, and the valves operate in an interlocked manner. In detail, the opening of the valve of the second air intake part 142 becomes smaller as the opening of the valve of first air intake part 141 becomes larger. Thus, while not changing the total amount of air taken in through the first and second air intake parts 141 and 142, the ratio of the air amount taken in through the first air intake part 141 to the air amount taken in through the second air intake part 142 is changed. Therefore, by varying the opening of each valve, the temperature of the air (fresh air) taken into the intake passage 40 can be adjusted. Although illustration is omitted, the intake air switch valve 143 according to this embodiment changes the opening of each valve in the interlocked manner by coupling the valves through a common axis.

(Control System of Engine)

The engine 1 is provided with the ECU (Engine Control Unit) 100 for controlling operation of the engine body 10. The ECU 100 is a controller based on a well-known microcomputer, and as illustrated in FIG. 4, includes a processor (e.g., a central processing unit (CPU)) 101 which executes a program, memory 102 which is comprised of RAM (Random Access Memory) and/or ROM (Read Only Memory) for example, and stores the programs and data, and an input/output bus 103 which inputs and outputs an electrical signal.

Figure 4:
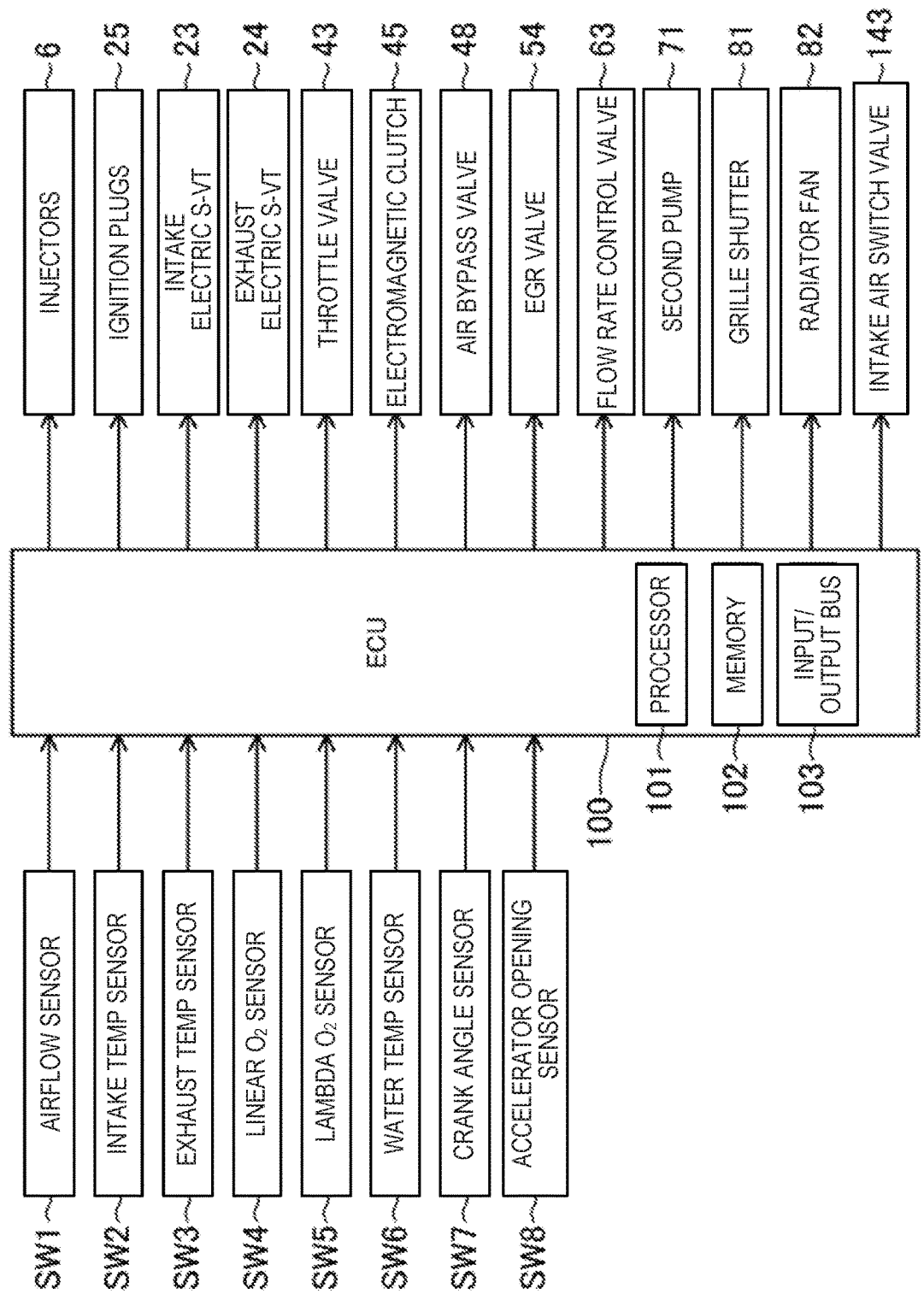
FIG. 4 is a block diagram illustrating a configuration of a control system of the engine.

As illustrated in FIGS. 1 and 4, the ECU 100 is connected to an airflow sensor SW1, an intake temperature sensor SW2, an exhaust temperature sensor SW3, a linear $O_2$ sensor SW4, a lambda (λ) $O_2$ sensor SW5, a fluid temperature sensor SW6, a crank angle sensor SW7, and an accelerator opening sensor SW8. The sensors SW1-SW8 each output a detection signal to the ECU 100.

That is, the airflow sensor SW1 is disposed downstream of the air cleaner 41 in the intake passage 40 and detects a flow rate of fresh air flowing through the intake passage 40. The intake temperature sensor SW2 is attached to the surge tank 42 and detects the temperature of intake air supplied to the combustion chamber 17. The exhaust temperature sensor SW3 is disposed at the exhaust passage near the downstream of the exhaust manifold, and detects the temperature of exhaust gas discharged from the combustion chamber 17. The linear $O_2$ sensor SW4 is disposed upstream of the upstream catalytic converter in the exhaust passage 50 and detects an oxygen concentration in the exhaust gas. The lambda $O_2$ sensor SW5 is disposed downstream of the three-way catalyst 511 in the upstream catalytic converter and detects an oxygen concentration in the exhaust gas. The fluid temperature sensor SW6 is attached to the cylinder head 13 of the engine body 10 near the outlet of the engine coolant and detects the temperature of the engine coolant. The crank angle sensor SW7 is attached to the engine body 10 and detects a rotation angle of the crankshaft 15. The accelerator opening sensor SW8 is attached to an accelerator pedal mechanism and detects an accelerator opening corresponding to an amount of operation of the accelerator pedal.

The ECU 100 determines the operating state of the engine body 10 and calculates a controlled amount (parameter) of each device based on these detection signals of the sensors SW1 to SW8. The ECU 100 outputs a control signal according to the calculated controlled amount to each of the injector 6, the ignition plug 25, the intake electric S-VT 23, the exhaust electric S-VT 24, the throttle valve 43, the electromagnetic clutch 45 of the supercharger 44, the air bypass valve 48, the EGR valve 54, the flow rate control valve 63, the second pump 71, the grille shutter 81, the radiator fan 82, and the intake air switch valve 143. The ECU 100 is a controller which controls the operation of the engine body 10 including operations of the air bypass valve 48, the flow rate control valve 63 (fluid temperature adjuster), the grille shutter 81 (fluid temperature adjuster, air amount adjuster), and the radiator fan 82 (fluid temperature adjuster, air amount adjuster).

For example, the ECU 100 calculates an engine speed of the engine body 10 based on the detection signal of the crank angle sensor SW7. The ECU 100 calculates an engine load of the engine body 10 based on the detection signal of the accelerator opening sensor SW8.

Moreover, the ECU 100 sets a target EGR rate (i.e., a ratio of the EGR gas to the entire gas inside the combustion chamber 17) based on the operating state of the engine body 10 (mainly, the load and the speed of the engine body 10) and a preset map. Then, the ECU 100 determines a target EGR amount based on the target EGR rate and an intake air amount based on the detection signal of the accelerator opening sensor SW8. Moreover, by adjusting the opening of the EGR valve 54, the ECU 100 performs a feedback control so that the external EGR amount introduced into the combustion chamber 17 becomes the target EGR amount.

Further, the ECU 100 performs an air-fuel ratio feedback control when a given control condition is satisfied. Specifically, based on the oxygen concentrations in the exhaust gas detected by the linear $O_2$ sensor SW4 and the lambda $O_2$ sensor SW5, the ECU 100 adjusts a fuel injection amount of the injector 6 so that an air-fuel ratio (A/F) of the mixture gas inside the combustion chamber 17 (or a gas-fuel weight ratio (G/F) of gas inside the combustion chamber 17 to the fuel) becomes a desired value.

(Operation Control of Engine)

Figure 5:
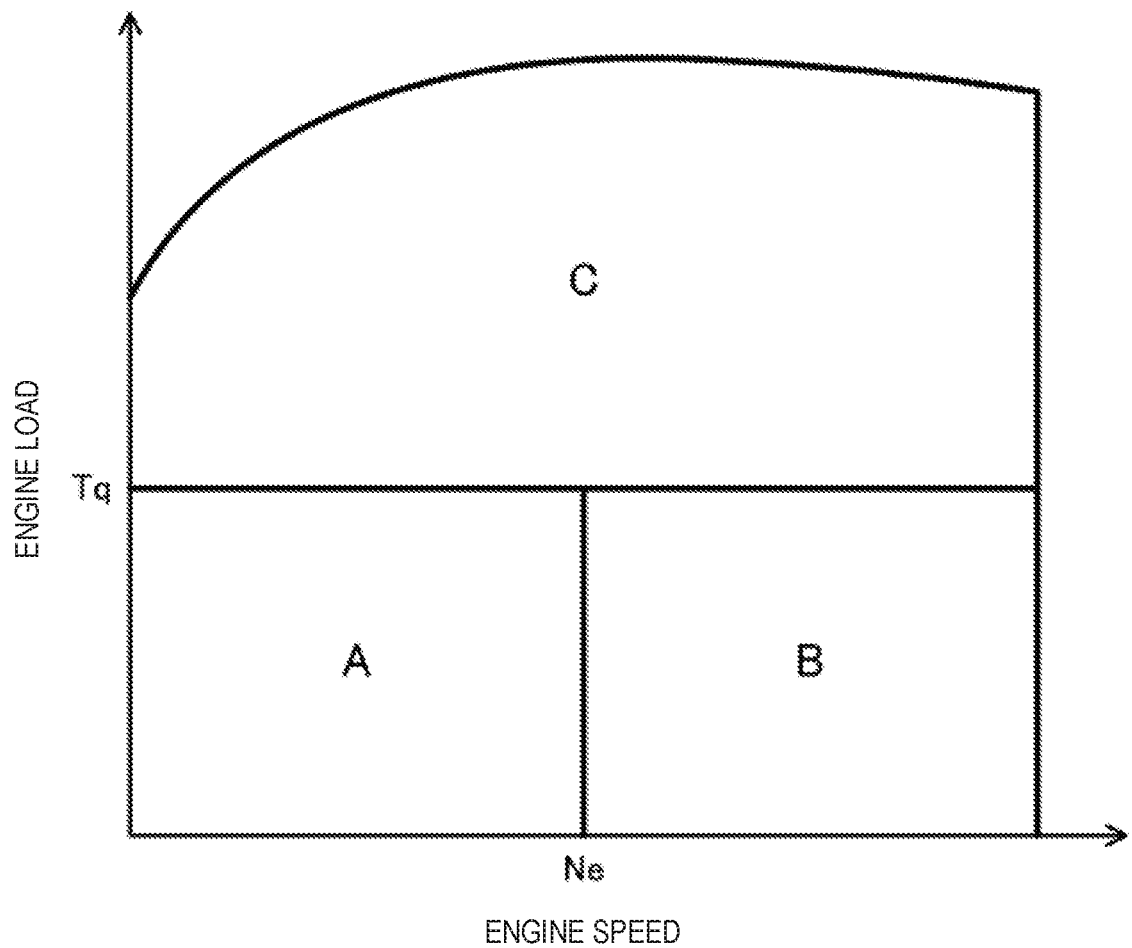
FIG. 5 is a view illustrating an operating range map of an engine body of the engine.

FIG. 5 illustrates an operating range map of the engine body 10 when the engine body 10 is warm (i.e., after a warm-up of the engine body 10). The operating range map of the engine body 10 is defined by the load of the engine body 10 (hereinafter, referred to as the "engine load") and the speed of the engine body 10 (hereinafter, referred to as the "engine speed"), and is divided into three operating ranges depending on the engine load and the engine speed. In detail, the three operating ranges are comprised of a low-load low-speed operating range A where an idle operation is included, the engine speed is below a given engine speed Ne, and the engine load is below a given load Tq (hereinafter, may be referred to as "range A"), a low-load high-speed operating range B where the engine speed is the given engine speed Ne or above, and the engine load is below the given load Tq (hereinafter, may be referred to as "range B"), and a high-load range C where the engine load is the given load Tq or above (hereinafter, may be referred to as "range C"). Here, the given engine speed Ne may be about 3500 rpm, for example.

In this embodiment, in order to mainly improve combustion stability of the engine body 10 and improve fuel efficiency, the ECU 100 sets the combustion mode of the engine body 10 to a compression ignition combustion mode in which the unburnt mixture gas is caused to self-ignite during the flame propagation combustion of the mixture gas by jump-spark ignition inside the combustion chamber 17, even if the operating state of the engine body 10 is in any of the ranges A-C. That is, the ECU 100 controls the timing, etc. of the jump-spark ignition by the ignition plug 25 in each of the ranges A-C to cause SPCCI combustion to be performed inside the combustion chamber 17. In order to stably perform SPCCI combustion, the ECU 100 controls the temperature of the intake air introduced into the engine body 10 by utilizing the cooling system of the engine 1. Below, operation of the engine body 10 in each of the ranges A-C is described in detail with reference to FIGS. 6 to 9.

(Low-Load Low-Speed Operating Range A)

While the operating state of the engine body 10 is in the range A, SPCCI combustion is performed in the combustion chamber 17 of the engine body 10 in a state where the air-fuel ratio (A/F) of the mixture gas is lean which is larger than a stoichiometric air-fuel ratio. In detail, the ECU 100 causes the injector 6 to inject fuel so that the air-fuel ratio (A/F) inside the combustion chamber becomes 25:1 or more, and operates the ignition plug 25 at a desired timing. Problems do not arise in the emission if the air-fuel ratio (A/F) is 25:1 or more. In order to stably perform SPCCI combustion (especially, CI combustion) in the lean state, it is required to increase a compression end temperature. Then, the ECU 100 controls and operates each device so that intake air at or above a first intake air temperature Ta1 is introduced into the engine body 10. Note that the first intake air temperature Ta1 is about 80° C., for example.

Figure 6:
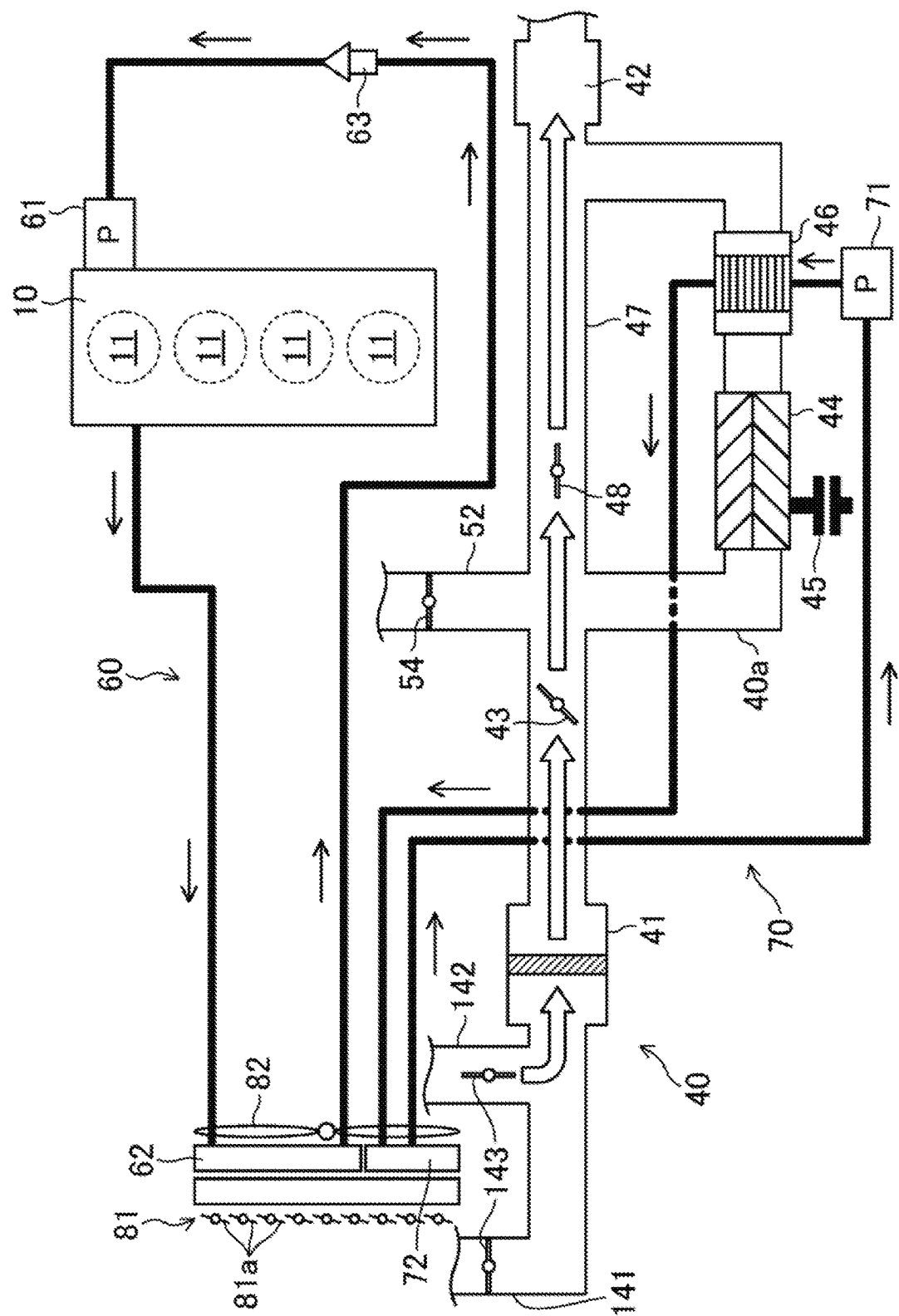
FIG. 6 is a view illustrating a flow of intake air, a flow of engine coolant, and a flow of intercooler coolant when an operating state of the engine body is in a low-load low-speed operating range A of FIG. 5.

In detail, when the operating state of the engine body 10 is in the range A, as illustrated in FIG. 6, the ECU 100 outputs the operational signal to the intake air switch valve 143 so that the first air intake part 141 becomes fully closed and the second air intake part 142 becomes fully opened. Moreover, the ECU 100 outputs control signals to the electromagnetic clutch 45 and the air bypass valve 48 to disconnect the electromagnetic clutch 45 and fully open the air bypass valve 48 so that the supercharger 44 is not driven and the bypass passage 47 is opened. Moreover, the ECU 100 turns off the power to the flow rate control valve 63 so that hot engine coolant flows into the first radiator 62. Moreover, the ECU 100 adjusts the opening of the grille shutter 81 and the rotational speed of the radiator fan 82 so that intake air at the first intake air temperature Ta1 or higher is taken in through the second air intake part 142. Moreover, the ECU 100 fully closes the EGR valve 54. Thus, in this embodiment, when the operating state of the engine body 10 is in the range A, EGR gas is not introduced into the combustion chamber 17 because the EGR valve 54 is fully closed. Note that when the operating state of the engine body 10 is in the range A, it is also possible to introduce the EGR gas into the combustion chamber 17. In this case, fuel is injected from the injector 6 so that the weight ratio G/F of gas inside the combustion chamber 17 to the fuel becomes 25:1 or higher.

When the power to the flow rate control valve 63 is turned off, the flow rate control valve 63 will not be opened until the engine coolant reaches a temperature above the fluid temperature setting. Thus, in the state where the engine coolant is below the fluid temperature setting, the engine coolant is heated by the heat of the engine body 10 without circulating. When the engine coolant becomes above the fluid temperature setting, the flow rate control valve 63 begins to open and the engine coolant begins to circulate through the first cooling path 60. Therefore, the hot engine coolant above the fluid temperature setting flows into the first radiator 62. The engine coolant which flows into the first radiator 62 is the engine coolant to be supplied to the first radiator 62 from the engine body 10, and the after passing through the flow rate control valve 63 and being heated by the engine body 10. Thus, the temperature of the engine coolant which flows into the first radiator 62 from the engine body 10 (corresponding to the temperature detected by the fluid temperature sensor SW6) is higher than the preset fluid temperature. Note that when the operating state of the engine body 10 is in the range A, the opening of the flow rate control valve 63 varies within a temperature range where the temperature of the engine coolant at the location of the flow rate control valve 63 falls within the "range A" of the graph in FIG. 3.

The ECU 100 controls operations of the grille shutter 81 and the radiator fan 82 so that the detection result of the fluid temperature sensor SW6 becomes a first fluid temperature Tw1. When the detection result of the fluid temperature sensor SW6 is below the first fluid temperature Tw1, the ECU 100 fully closes the opening of the grille shutter 81 and sets the rotational speed of the radiator fan 82 to 0 (i.e., the radiator fan 82 is not driven). Therefore, when the engine coolant is below the first fluid temperature Tw1, the engine coolant is not cooled by the outside air and the fluid temperature increases. When the detection result of the fluid temperature sensor SW6 becomes above the first fluid temperature Tw1, the ECU 100 opens the grille shutter 81 and increases the rotational speed of the radiator fan 82. In the state where the hot engine coolant flows into the first radiator 62, when the grille shutter 81 is opened and the radiator fan 82 is driven, hot outside air which has exchanged heat with the hot engine coolant flowing through the first radiator 62 flows rearward of the radiator fan 82. Therefore, the hot outside air, i.e., intake air (fresh air) at or above the first intake air temperature Ta1 is taken into the intake passage 40 through the second air intake part 142. Note that the first fluid temperature Tw1 is a temperature higher than the fluid temperature setting (for example, about 105° C.).

As illustrated in FIG. 6, the hot intake air taken in through the second air intake part 142 passes through the bypass passage 47 and flows into the surge tank 42. Then, the hot intake air is introduced into the combustion chamber 17 of the engine body 10.

When the detection result of the fluid temperature sensor SW6 becomes below the first fluid temperature Tw1, or when the detection result of the intake temperature sensor SW2 becomes below the first intake air temperature Ta1, the ECU 100 executes at least one of a control to reduce the opening of the grille shutter 81, or a control to lower the rotational speed of the radiator fan 82. Therefore, the intake air at or above the first intake air temperature Ta1 is stably introduced to the engine body 10. Moreover, the ECU 100 adjusts the opening of the grille shutter 81 within a small opening range, in order to keep the temperature of the engine coolant at or above the first fluid temperature Tw1 as much as possible. In detail, the opening of the grille shutter 81 is adjusted so that the angle at the acute angle side of the flappers 81a with respect to the vertical direction becomes within a range below 30°.

As described above, by operating and controlling each device, while the engine body 10 operates in the range A (when the operating state of the engine body 10 is in the range A), the comparatively hot intake air (at or above the first intake air temperature Ta1) is introduced into the engine body 10. Therefore, when the engine body 10 operates in the range A, SPCCI combustion can be stably performed.

Moreover, when the engine body 10 operates in the range A, the ECU 100 outputs the control signal to the second pump 71 so that the intercooler coolant is supplied to the intercooler 46. That is, while the intake air at the first intake air temperature Ta1 passes through the bypass passage 47, the supercharging side passage 40a is heated by the heat transfer from the bypass passage 47. Thus, at the moment when the operating state of the engine body 10 becomes in the range where the supercharger 44 is driven (for example, range C) from the range A, the hot air which is heated by the heat transfer described above is introduced into the engine body 10. In order to reduce this, even if the supercharger 44 is in the non-driving state (i.e., the electromagnetic clutch 45 is disconnected), the intercooler coolant is supplied to the intercooler 46 so that the air inside the supercharging side passage 40a is not excessively heated. At this time, the ECU 100 outputs the control signal to the second pump 71 so that the flow rate of the intercooler coolant supplied per unit time to the intercooler 46 becomes a first flow rate.

(Low-Load High-Speed Operating Range B)

While the operating state of the engine body 10 is in the range B, SPCCI combustion is performed inside the combustion chamber 17 of the engine body 10 in the state where the air-fuel ratio (A/F) (or G/F) of the mixture gas becomes at or near the stoichiometric air-fuel ratio. In detail, the ECU 100 causes the injector 6 to inject fuel so that the air-fuel ratio (A/F) (or G/F) becomes 14.5:1 to 15.0:1, and operates the ignition plug 25 at a desired timing. If the air-fuel ratio (A/F) (or G/F) becomes 14.5:1 to 15.0:1, raw NOx generated inside the combustion chamber 17 is purified well with the three-way catalysts 511 and 513. In the range B, since the engine speed is high, it is necessary to increase a compression end temperature to facilitate a generation of the compression ignition, in order to stably perform SPCCI combustion (especially, CI combustion). Thus, also while the operating state of the engine body 10 is in the range B, the ECU 100 controls and operates each device so that intake air at or above the first intake air temperature Ta1 is introduced into the engine body 10.

Figure 7:
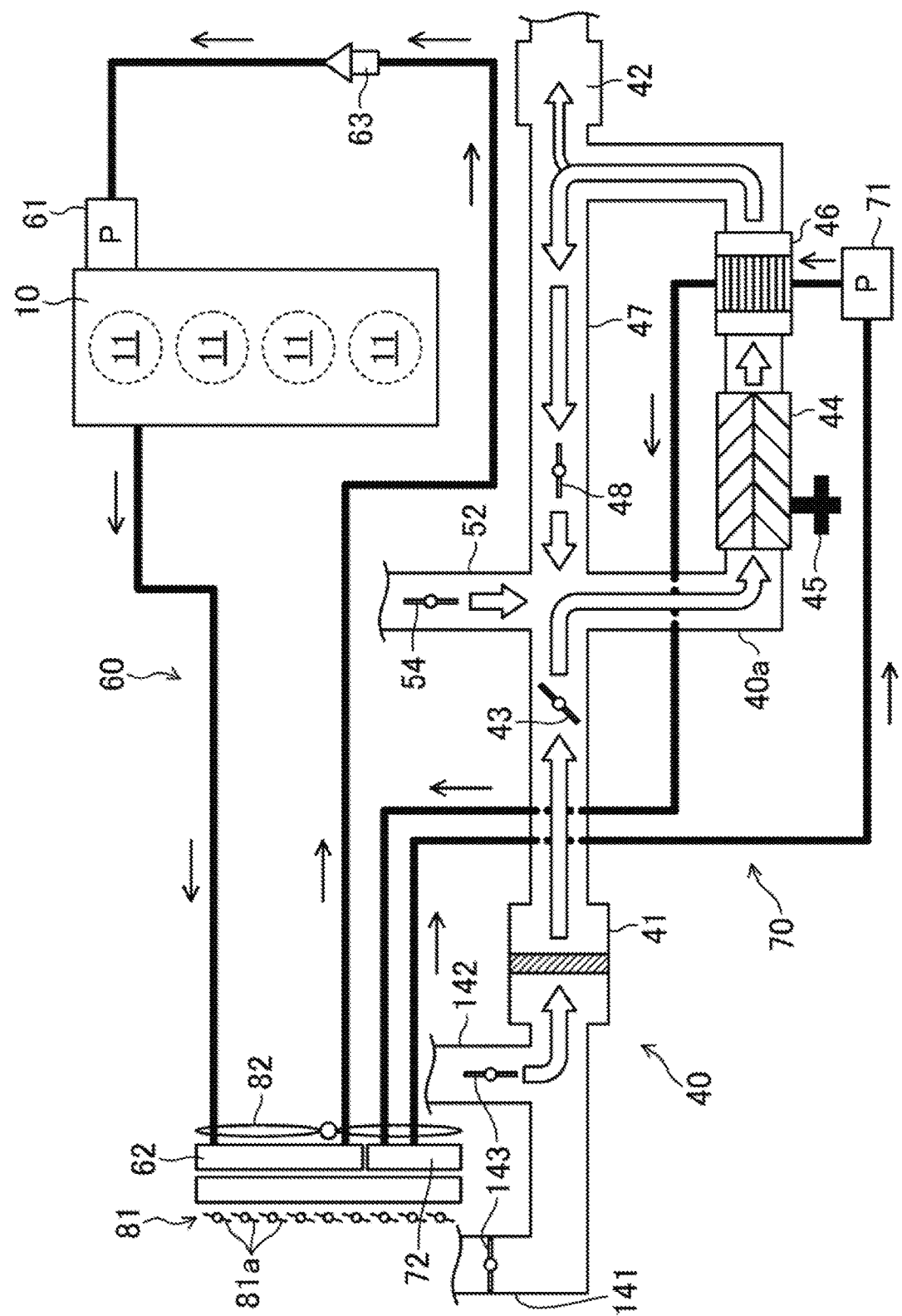
FIG. 7 is a view illustrating a flow of intake air, a flow of engine coolant, and a flow of intercooler coolant when the operating state of the engine body is in a low-load high-speed operating range B of FIG. 5.

In detail, when the operating state of the engine body 10 is in the range B, as illustrated in FIG. 7, the ECU 100 outputs the operational signal to the intake air switch valve 143 so that the first air intake part 141 is fully closed and the second air intake part 142 is fully opened. Moreover, the ECU 100 outputs the control signals to the electromagnetic clutch 45 and the air bypass valve 48 to connect the electromagnetic clutch 45 and fully open the air bypass valve 48 so that the supercharger 44 is driven and the bypass passage 47 is opened. Moreover, the ECU 100 turns on the power to the flow rate control valve 63. Moreover, the ECU 100 adjusts the opening of the grille shutter 81 and the rotational speed of the radiator fan 82 so that intake air at or above the first intake air temperature Ta1 is taken in through the second air intake part 142. Moreover, the ECU 100 opens the EGR valve 54 to introduce the EGR gas into the intake passage 40 (then, into the combustion chamber 17). Note that when the operating state of the engine body 10 is in the range B, the EGR gas may not be introduced into the combustion chamber 17.

When turning on the power to the flow rate control valve 63, the flow rate control valve 63 opens, even if the engine coolant is below the fluid temperature setting. Thus, even if the engine coolant is below the fluid temperature setting, the engine coolant circulates through the first cooling path 60. Therefore, the engine coolant below the first fluid temperature Tw1 flows into the first radiator 62. Note that when the operating state of the engine body 10 is in the range B, the opening of the flow rate control valve 63 varies within a range where the temperature of the engine coolant at the location of the flow rate control valve 63 falls within the "range B" of the graph in FIG. 3 (a range where the temperature is lower than the "range A").

While the operating state of the engine body 10 is in the range B, the ECU 100 opens the grille shutter 81 and drives the radiator fan 82, even if the detection result of the fluid temperature sensor SW6 is below the first fluid temperature Tw1. In more detail, the ECU 100 adjusts the opening of the grille shutter 81 and the rotational speed of the radiator fan 82 so that the detection result of the fluid temperature sensor SW6 becomes below the first fluid temperature Tw1 and exceeds a second fluid temperature Tw2. In detail, the ECU 100 adjusts the opening of the grille shutter 81 so that the angle at the acute angle side of the flappers 81a with respect to the vertical direction becomes within a range of 30° or more and below 60°. Moreover, the ECU 100 increases the rotational speed of the radiator fan 82 compared to the case where the operating state of the engine body 10 is in the range A. After the outside air has exchanged heat with the engine coolant flowing through the first radiator 62 flows rearward of the radiator fan 82, it is then taken into the intake passage 40 through the second air intake part 142. At this time, the temperature of the intake air (fresh air) taken in from the second air intake part 142 to the intake passage 40 is higher than the ambient temperature, but is lower compared to the case where the operating state of the engine body 10 is in the range A. Note that the second fluid temperature Tw2 is a temperature lower than the first fluid temperature Tw1 (for example, about 90° C.).

As described above, when the bypass passage 47 is opened and the supercharger 44 is driven, a portion of the intake air which passed through the supercharger 44 flows back to the upstream side of the supercharger 44 through the bypass passage 47, as illustrated in FIG. 7. Thus, after the portion of the intake air taken in to the intake passage 40 through the second air intake part 142 is temporarily compressed by the supercharger 44, it then flows back to the upstream side of the supercharger 44 through the bypass passage 47, whereas the remaining intake air according to the engine specification is introduced into the combustion chamber 17. The intake air which flowed backward to the upstream of the supercharger 44 through the bypass passage 47 again passes through the supercharger 44. Thus, the intake air inside the intake passage 40 circulates (recirculates) inside the intake passage 40 through the supercharging side passage 40a and the bypass passage 47. Therefore, even if the supercharger 44 is driven, the intake air can be introduced into the combustion chamber 17 in the non-boosted state.

Since the intake air during the recirculation is compressed by the supercharger 44, its temperature increases. Moreover, when the operating state of the engine body 10 is in the range B, since the EGR valve 54 is opened, the EGR gas is taken into the recirculating intake air. Since the EGR gas is higher in the temperature than the intake air taken into the intake passage 40 through the second air intake part 142, the temperature of the intake air into which the EGR gas is taken increases.

In order to prevent the recirculating intake air (fresh air+EGR gas) from becoming excessively high in temperature, the ECU 100 outputs the control signal to the second pump 71 so that the intercooler coolant may be supplied to the intercooler 46. Therefore, the recirculating intake air is cooled by the intercooler 46. At this time, the ECU 100 outputs the control signal to the second pump 71 so that a flow rate of the intercooler coolant supplied per unit time to the intercooler 46 becomes a second flow rate. The second flow rate is more than the first flow rate, and is such a flow rate that the temperature of the recirculating intake air does not become below the first intake air temperature Ta1.

As described above, while the engine body 10 operates in the range B, the intake air is heated by the recirculating of intake air and the introduction of EGR gas. Thus, the intake air at or above the first intake air temperature Ta1 can be introduced into the combustion chamber 17 of the engine body 10, even if the flow rate control valve 63 is opened under a state where the engine coolant is below the fluid temperature setting. Therefore, SPCCI combustion can be stably performed, while the engine body 10 operates in the range B.

(High-Load Operating Range C)

While the operating range of the engine body 10 is in the range C, A/F (or G/F) of the mixture gas inside the combustion chamber 17 of the engine body 10 performs SPCCI combustion in the state of at or near a stoichiometric air-fuel ratio. In detail, the ECU 100 causes the injector 6 to inject fuel so that A/F (or G/F) becomes 14.5:1 to 15.0:1, and operates the ignition plug 25 at a desired timing. In the high engine load state, since there is a large amount of fuel injected, as much intake air (fresh air) as possible is needed in order to acquire a suitable combustion torque. Moreover, in the high engine load state, since there is a large amount of fuel injected, if the temperature of the engine body 10 is too high, the mixture gas self-ignites while being compressed, thereby causing a premature ignition of the fuel at the unintended timing. Thus, when the operating state of the engine body 10 is in the range C, intake air (especially, fresh air) at low temperature and with a high air density needs to be introduced into the engine body 10 in order to stably perform SPCCI combustion. Moreover, it is necessary to cool the engine body 10 appropriately. Thus, the ECU 100 controls and operates each device so that intake air at or below a second intake air temperature Ta2 is introduced into the engine body 10, and the engine body 10 is cooled appropriately. Note that the second intake air temperature Ta2 is a temperature below the first intake air temperature Ta1 (for example, about 60° C.).

Figure 8:
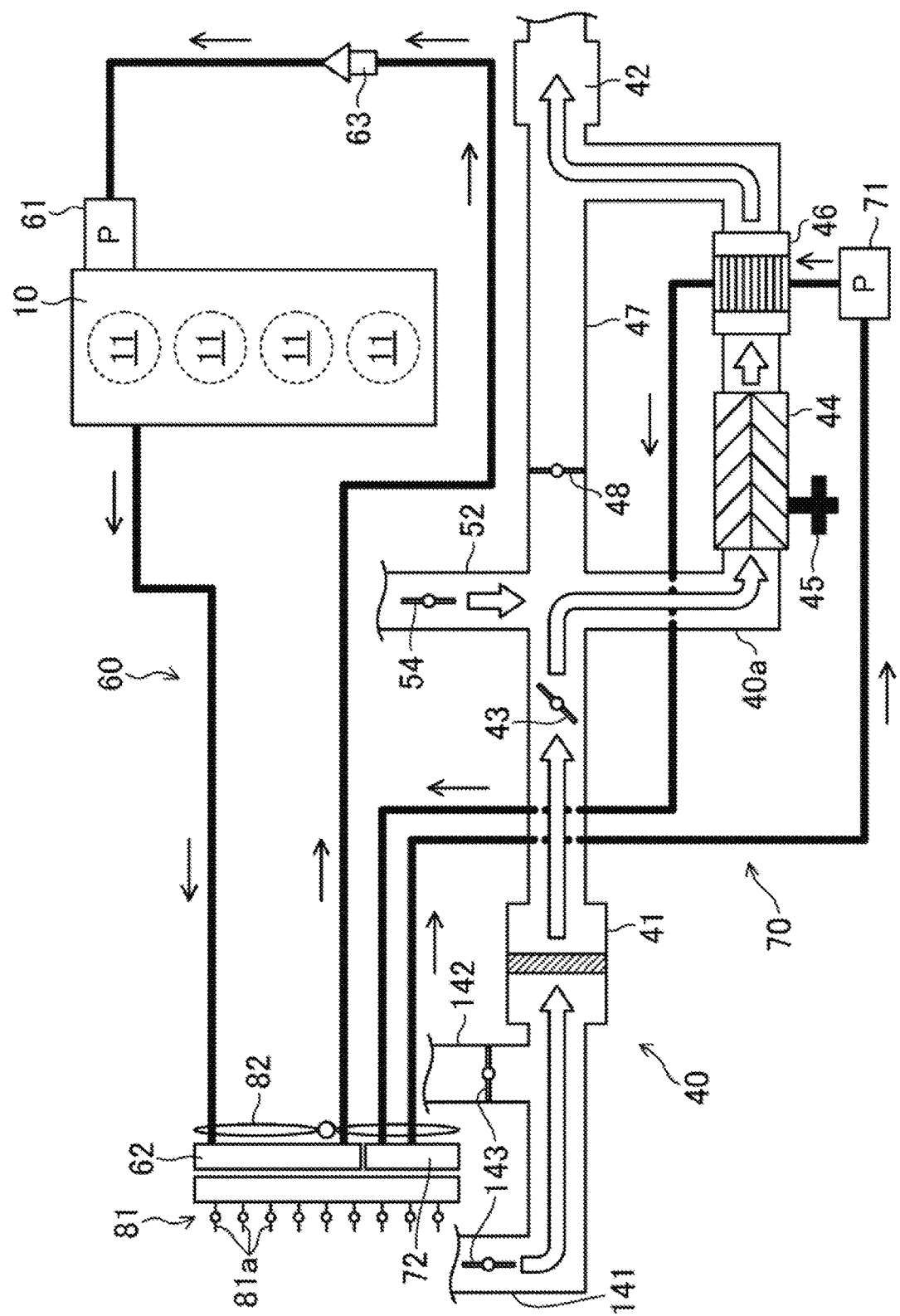
FIG. 8 is a view illustrating a flow of intake air, a flow of engine coolant, and a flow of intercooler coolant when the operating state of the engine body is in a high-load operating range C of FIG. 5.

In detail, when the operating state of the engine body 10 is in the range C, as illustrated in FIG. 8, the ECU 100 outputs the operational signal to the intake air switch valve 143 so that the first air intake part 141 is fully opened and the second air intake part 142 is fully closed. Moreover, the ECU 100 outputs the control signals to the electromagnetic clutch 45 and the air bypass valve 48 to connect the electromagnetic clutch 45 and fully close the air bypass valve 48 so that the supercharger 44 is driven and the bypass passage 47 is closed. Moreover, the ECU 100 turns on the power to the flow rate control valve 63. Moreover, the ECU 100 adjusts the opening of the grille shutter 81 and the rotational speed of the radiator fan 82 so that the engine coolant and the intercooler coolant are cooled. Moreover, the ECU 100 opens the EGR valve 54 to introduce the EGR gas into the intake passage 40 (then, into the combustion chamber 17). Note that when the operating state of the engine body 10 is in the range C, the EGR gas may not be introduced into the combustion chamber 17.

As described above, by turning on the power to the flow rate control valve 63, the flow rate control valve 63 opens, even if the engine coolant is below the fluid temperature setting. Thus, even if the engine coolant is below a given fluid temperature, the engine coolant circulates through the first cooling path 60. Therefore, the engine coolant below the fluid temperature setting flows into the first radiator 62. Note that when the operating state of the engine body 10 is in the range C, the opening of the flow rate control valve 63 varies within a range where the temperature of the engine coolant at the location of the flow rate control valve 63 falls within the "range C" of the graph in FIG. 3 (a range where the temperature is lower than the "range B").

When the operating state of the engine body 10 is in the range C, the ECU 100 opens the grille shutter 81 and drives the radiator fan 82. At this time, the ECU 100 adjusts the opening of the grille shutter 81 and the rotational speed of the radiator fan 82 so that the detection result of the fluid temperature sensor SW6 becomes the second fluid temperature Tw2. In detail, the ECU 100 adjusts the opening of the grille shutter 81 within a large opening range, i.e., a range where the angle at the acute angle side of the flappers 81a with respect to the vertical direction (including a right angle) becomes 60° or more and 90° or less. Moreover, the ECU 100 makes the rotational speed of the radiator fan 82 higher than the rotational speed when the operating state of the engine body 10 is in the range B. Accordingly, as compared with the cases where the operating state of the engine body 10 is in the low-load operating range (range A and range B), the amount of air (outside air) which flows to the first and second radiators 62 and 72 increases in the range C. Therefore, the coolant which flows through the first radiator 62 can be actively cooled, and the engine body 10 can be cooled appropriately.

On the other hand, in the intake system, intake air (fresh air) is taken into the intake passage 40 through the first air intake part 141. When the operating state of the engine body 10 is in the range C, since the EGR valve 54 is opened, EGR gas is taken into the intake air which is taken into the intake passage 40 through the first air intake part 141. Moreover, since the air bypass valve 48 is fully closed, the intake air (fresh air+EGR gas) flows toward the supercharging side passage 40a. Since the electromagnetic clutch 45 is connected and the supercharger 44 is driven, the intake air which flowed toward the supercharging side passage 40a is boosted by the supercharger 44. Therefore, the temperature of the intake air increases.

Then the ECU 100 outputs the control signal to the second pump 71 so that the intercooler coolant is supplied to the intercooler 46, in order to make the temperature of the intake air boosted by the supercharger 44 at or below the second intake air temperature Ta2. At this time, the ECU 100 outputs the control signal to the second pump 71 so that the flow rate of the intercooler coolant supplied per unit time to the intercooler 46 becomes a third flow rate. The third flow rate is more than the second flow rate. Thus, the temperature of the intake air can be made at or below the second intake air temperature Ta2 by increasing the flow rate of the intercooler coolant supplied to the intercooler 46. Moreover, as described above, when the operating state of the engine body 10 is in the range C, the amount of the outside air which flows to the second radiator 72 increases, as compared with the cases when the operating state of the engine body 10 is in the ranges A and B. Thus, the temperature of the intercooler coolant is low as compared with the cases when the operating state of the engine body 10 is in the ranges A and B. Therefore, the temperature of intake air can be made at or below the second intake air temperature Ta2 more efficiently.

The intake air which is boosted by the supercharger 44 and cooled at or below the second intake air temperature Ta2 by the intercooler 46 is supplied to the combustion chamber 17 of the engine body 10 through the surge tank 42.

By operating and controlling each device as described above, when the engine body 10 operates in the range C, the intake air at a comparatively low temperature (at or below the second intake air temperature Ta2) is introduced into the engine body 10, and the engine body 10 is cooled appropriately. Therefore, when the engine body 10 operates in the range C, SPCCI combustion can be stably performed.

(Operation of Each Device in Accordance with Change in Operating State of Engine Body)

Figure 9:
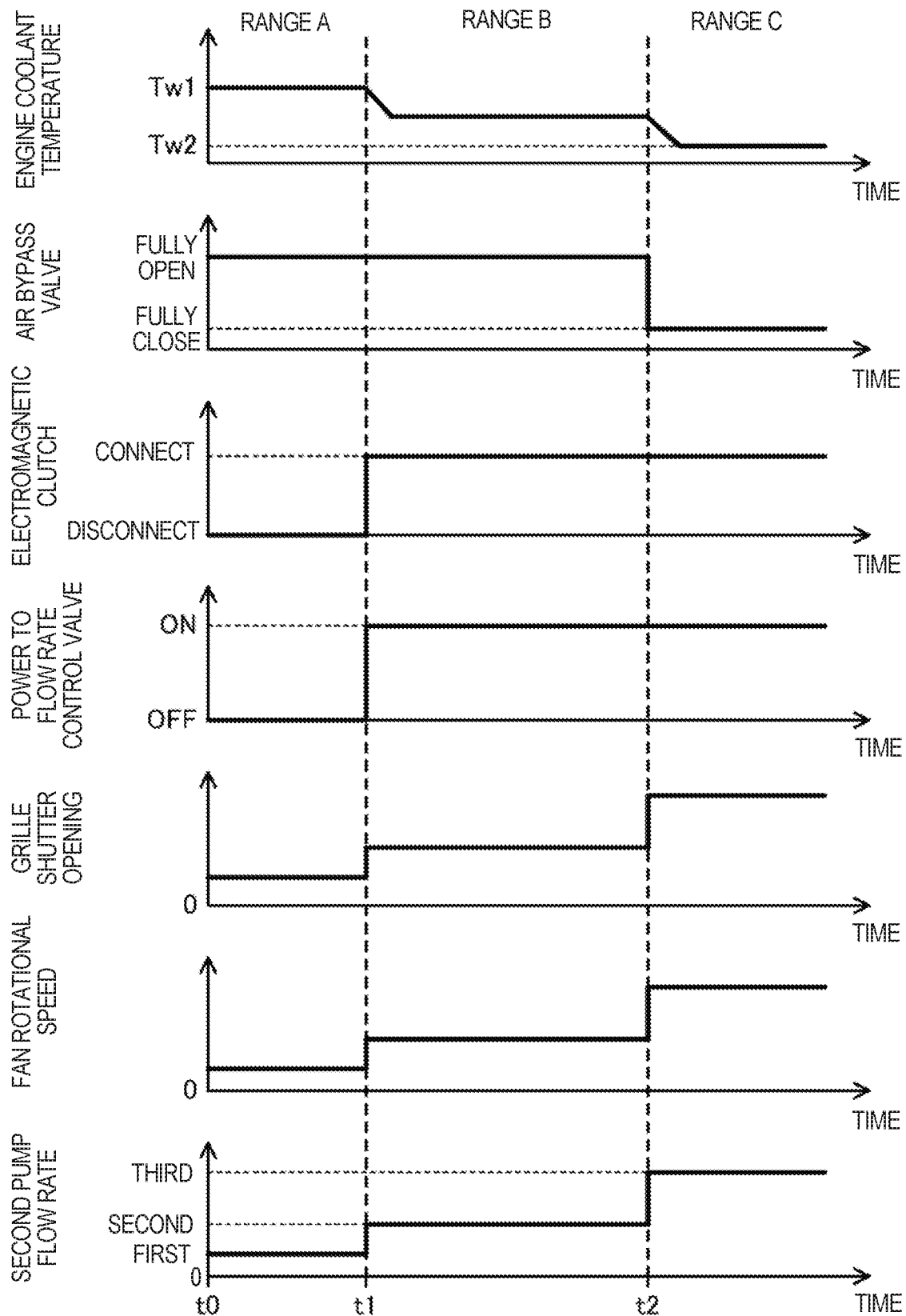
FIG. 9 is a time chart illustrating one example of a driving state of each device according to the flow of intake air, the flow of engine coolant, and the flow of intercooler coolant.

FIG. 9 is a time chart illustrating a change in the operating state of each device in accordance with the change in the operating state of the engine body 10. First, suppose that the operating state of the engine body 10 is in the range A at a time t0. At this time, as described above, the ECU 100 operates and controls each device so that the temperature of the engine coolant to the first radiator 62 becomes the first fluid temperature Tw1 and the intake air temperature becomes the first intake air temperature Ta1. Moreover, the ECU 100 causes the injector 6 to inject fuel so that the air-fuel ratio A/F inside the combustion chamber 17 becomes 25:1 or higher to be a lean air-fuel ratio, and operates the ignition plug 25 at a desired timing. Further, the ECU 100 disconnects the electromagnetic clutch 45 and fully opens the air bypass valve 48.

Note that in FIG. 9, the operations of the intake air switch valve 143 and the EGR valve 54 are omitted. Describing these operations, the intake air switch valve 143 maintains the state where the second air intake part 142 is fully opened until a time t2, and at the time t2, the first air intake part 141 is fully opened, and, after that, the first air intake part 141 is maintained its fully-opened state. The EGR valve 54 maintains the fully closed state until a time t1, and at the time t2, it is opened and then maintains the opened state. The opening of the EGR valve 54 varies according to the operating state of the engine body 10.

Next, the engine speed goes up, and at the time t1, suppose that the operating state of the engine body 10 shifts from the range A to the range B. At this time, the ECU 100 causes the intake air switch valve 143 to keep that the second air intake part 142 is fully opened (fresh air is taken in through the second air intake part 142, similar to the range A). Moreover, the ECU 100 connects the electromagnetic clutch 45 and drives the supercharger 44, and keeps the air bypass valve 48 in the fully opened state, and recirculates a part of the intake air inside the intake passage 40. Further, the ECU 100 operates and controls each device so that the temperature of the engine coolant supplied to the first radiator 62 from the engine body 10 becomes below the first fluid temperature Tw1 and exceeds the second fluid temperature Tw2, and the intake air temperature becomes the first intake air temperature Ta1. In detail, the ECU 100 starts turning on the power to the flow rate control valve 63, increases the opening of the grille shutter 81, and increases the rotational speed of the radiator fan 82 so that the temperature of the engine coolant to the first radiator 62 becomes below the first fluid temperature Tw1 and exceeds the second fluid temperature Tw2. Further, the ECU 100 opens the EGR valve 54. Moreover, the ECU 100 increases the flow rate of the second pump 71 (changes it from the first flow rate to the second flow rate). In this way, the intake air temperature becomes the first intake air temperature Ta1. Further, the ECU 100 causes the injector 6 to inject fuel so that the air-fuel ratio (A/F) (or G/F) becomes the stoichiometric air-fuel ratio or a value near the stoichiometric air-fuel ratio (14.5:1 to 15.0:1), and operates the ignition plug 25 at a desired timing.

Next, the engine load goes up, and at the time t2, suppose that the operating state of the engine body 10 shifts from the range B to the range C. At this time, while the ECU 100 keeps the electromagnetic clutch 45 connected (keeps the supercharger 44 driven) and fully closes the air bypass valve 48 so that the boosted intake air is supplied to the engine body 10. Moreover, the ECU 100 operates and controls each device so that the temperature of the engine coolant supplied to the first radiator 62 from the engine body 10 becomes the second fluid temperature Tw2 and the intake air temperature becomes the second intake-air temperature Ta2. In detail, the ECU 100 keeps the power to the flow rate control valve 63 turned on. Moreover, the ECU 100 further increases the opening of the grille shutter 81, and further increases the rotational speed of the radiator fan 82. Thus, the temperature of the engine coolant becomes the second fluid temperature Tw2. Moreover, the ECU 100 operates the intake air switch valve 143 to take in fresh air through the first air intake part 141. Further, the ECU 100 further increases the flow rate of the second pump 71 (changes it to a third flow rate from the second flow rate). Thus, the intake air temperature becomes the second intake-air temperature Ta2. Further, the ECU 100 causes the injector 6 to inject fuel so that the air-fuel ratio (A/F) (or G/F) becomes the stoichiometric air-fuel ratio or the value near the stoichiometric air-fuel ratio (14.5:1 to 15.0:1), and operates the ignition plug 25 at a desired timing.

Here, when the operating state of the engine body 10 is in the range C, since the temperature inside the combustion chamber 17 becomes too high at a compression top dead center, the start timing of CI combustion tends to become too early. If the start timing of CI combustion is too early and becomes too close to the compression top dead center, since the pressure and the temperature inside the combustion chamber 17 increase abruptly by CI combustion when the load is high in a state where the pressure and the temperature inside the combustion chamber 17 are already high, combustion noise may increase and the NOx generated amount (raw NOx generated amount) inside the combustion chamber 17 may increase.

On the other hand, in this embodiment, when the operating state of the engine body 10 is in the range C, the target temperature of the engine coolant supplied to the first radiator 62 from the engine body 10 is lowered, compared with the case when the operating state of the engine body 10 is in the ranges A and B (ranges A and B correspond to the low-load operating range). That is, the target value of the temperature of the engine coolant supplied to the first radiator 62 from the engine body 10 (corresponding to the temperature detected by the fluid temperature sensor SW6) is the first fluid temperature Tw1 in the range A, it is below the first fluid temperature Tw1 and exceeds the second fluid temperature Tw2 in the range B, and it is the second fluid temperature Tw2 in the range C.

Therefore, in this embodiment, when the operating state of the engine body 10 is in the range C, the temperature inside the combustion chamber 17 at the compression top dead center can be prevented from becoming too high. As a result, at the suitable timing after SI combustion (desirably, 5° to 10° by the crank angle after the compression top dead center), CI combustion begins. Therefore, when the operating state of the engine body 10 is in the range C, since the start timing of CI combustion is prevented from becoming too close to the compression top dead center, the increase of combustion noise and the increase of the raw NOx generated amount are prevented, and since CI combustion is started at the suitable timing, the reduction of output torque and the lowering of fuel efficiency can be prevented.

The present disclosure is not limited to the above embodiment, and it can be substituted without departing from the scope of the appended claims.

Figure 10:
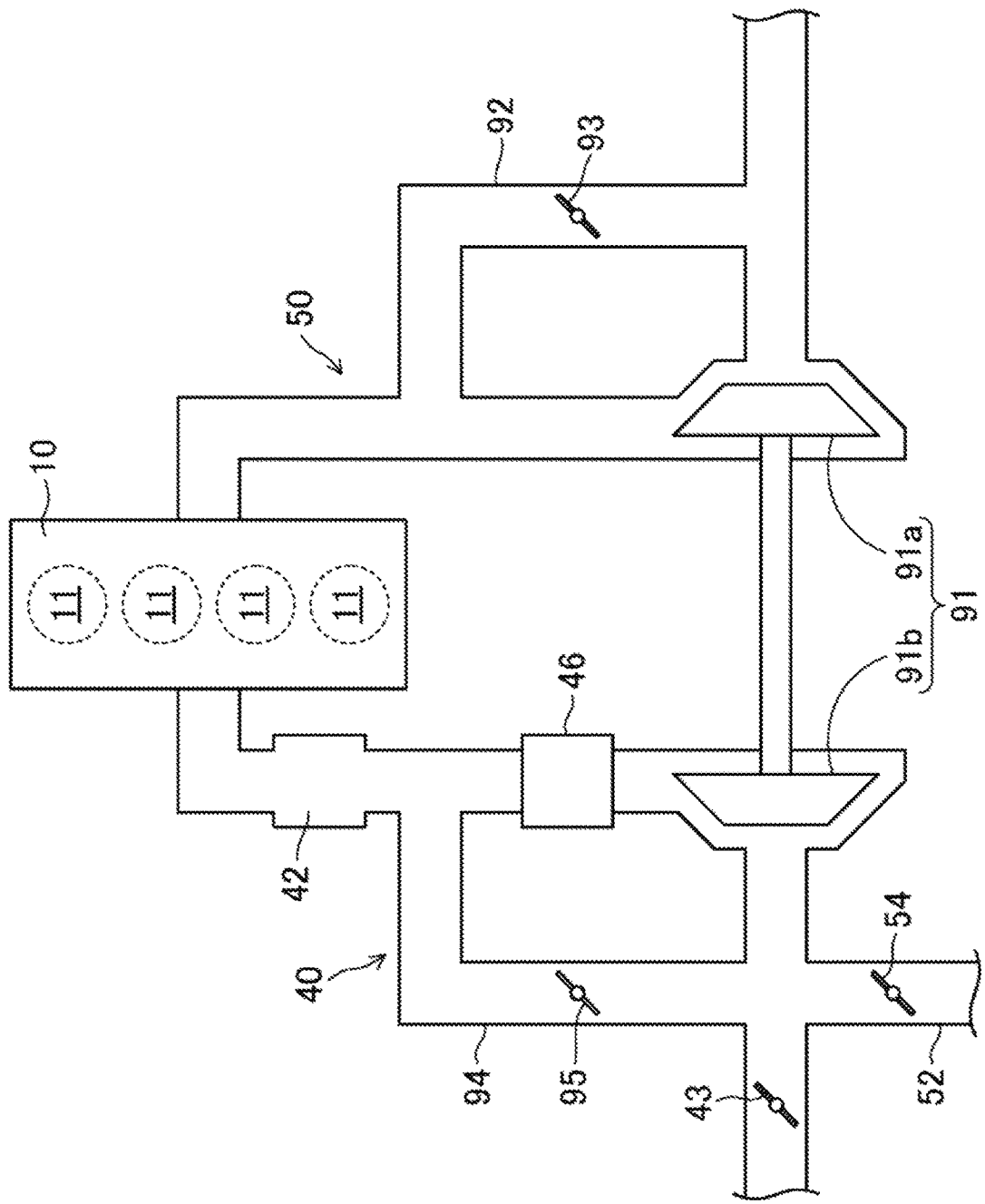
FIG. 10 is an outline view of a part of a compression ignition engine with a supercharger in a case where a turbocharged is used as the supercharger configured to boost intake air to a combustion chamber of an engine body.

For example, although in the above embodiment the mechanical supercharger 44 is used as the supercharger which boosts the intake air to the combustion chamber 17 of the engine body 10, a turbocharger 91 may also be used as illustrated in FIG. 10, instead of the mechanical supercharger 44. In this case, the bypass passage 47, the air bypass valve 48, and the electromagnetic clutch 45 in the above embodiment can be eliminated.

The turbocharger 91 has a turbine 91a disposed in the exhaust passage 50 connected to the engine body 10, and a compressor 91b which is disposed in the intake passage 40 connected to the engine body 10 and is driven by the turbine 91a. A turbine bypass passage 92 which bypasses the turbine 91a is provided in the exhaust passage 50, and the turbine bypass passage 92 is provided with a waste gate valve 93 which opens and closes the turbine bypass passage 92. On the other hand, the intake passage 40 is provided with a compressor bypass passage 94 which bypasses the compressor 91b (replacing the bypass passage 47), and the compressor bypass passage 94 is provided with a compressor bypass valve 95 which opens and closes the compressor bypass passage 94 (replacing the air bypass valve 48). The ECU 100 controls operations of the waste gate valve 93 and the compressor bypass valve 95. The configuration of the engine 1 other than the configuration of the turbocharger 91 is similar to that embodiment. Note that in FIG. 10, reference character "42" is a surge tank, "43" is a throttle valve, "46" is an intercooler, "52" is an EGR passage, and "54" is an EGR valve, and these are similar to those described in the above embodiment.

As described above, if the turbocharger 91 is used as the supercharger which boosts the intake air to the combustion chamber 17 of the engine body 10, the range B of the operating range map in the above embodiment may be eliminated, the ranges A and B may be used as the low-load operating range, and the range C may be used as the high-load operating range. Further, when the operating state of the engine body 10 is in the low-load operating range, the ECU 100 fully opens the waste gate valve 93 and the compressor bypass valve 95 so that the boosting of the intake air by the turbocharger 91 is not performed. On the other hand, when the operating state of the engine body 10 is in the high-load operating range, ECU 100 fully closes the waste gate valve 93 and the compressor bypass valve 95 so that the boosting of the intake air by the turbocharger 91 is performed. Therefore, the waste gate valve 93 and the compressor bypass valve 95 constitute the switch. When the operating state of the engine body 10 is in the high-load operating range, the ECU 100 lowers the target temperature of the engine coolant supplied to the first radiator 62 from the engine body 10, compared with the case when the operating state of the engine body 10 is in the low-load operating range. The controls of the flow rate control valve 63, the grille shutter 81, and the radiator fan in the low-load operating range and the high-load operating range described above may be similar to the controls in the ranges A and C in the above embodiment. Moreover, the controls of other devices in the low-load operating range and the high-load operating range described above may fundamentally be similar to the controls in the ranges A and C in the above embodiment.

Alternatively, similar to the above embodiment, the ranges A, B, and C may be provided in the operating range map. In the range B, the recirculation like the above embodiment may be performed by fully closing the waste gate valve 93 and fully opening the compressor bypass valve 95. The control of each device in the ranges A-C in this case may fundamentally be similar to the control in the ranges A-C in the above embodiment.

Moreover, although in the above embodiment SPCCI combustion is performed inside the combustion chamber 17 in the entire operating range of the engine body 10, it is not limited to this configuration. For example, SPCCI combustion may be performed only when the operating state of the engine body 10 is in the range C, and SI combustion may be performed in the ranges A and B where the boosting is not performed. Moreover, SPCCI combustion may be performed not only after the warmup of the engine body 10 but also performed before the warm-up, and SI combustion may be performed before the warm-up.

Further, although in the above embodiment the intercooler coolant is supplied to the intercooler 46 also when the operating state of the engine body 10 is in the range A, it is not necessary to supply the intercooler coolant to the intercooler 46 when the operating state of the engine body 10 is in the range A. Moreover, if the turbocharger 91 is used as the supercharger which boosts the intake air to the combustion chamber 17, it is not necessary to supply the intercooler coolant to the intercooler 46 when the operating state of the engine body 10 is in the low-load operating range described above.

Moreover, although in the above embodiment the air intake part of the intake passage 40 is comprised of two air intake parts (the first air intake part 141 and the second air intake part 142), the air intake part of the intake passage 40 may be comprised of the first air intake part 141 alone. However, when the engine load is low, it is desirable to provide both the first air intake part 141 and the second air intake part 142, in terms of supplying the intake air at approximately the first intake air temperature Ta1 to the engine body 10.

Further, in the above embodiment, when the operating state of the engine body 10 is in the range B, the ECU 100 operates and controls the intake air switch valve 143 so that the first air intake part 141 is fully closed and the second air intake part 142 is fully opened. Without being limited to this configuration, the ECU 100 may operate and control the intake air switch valve 143 when the operating state of the engine body 10 is in the range B so that both the first air intake part 141 and the second air intake part 142 are opened. In this case, the ECU 100 adjusts the valve opening of the first air intake part 141 and the valve opening of the second air intake part 142 so that the ratio of the amount of fresh air taken in through the first air intake part 141 to the amount of fresh air taken in through the second air intake part 142 becomes a suitable ratio.

The above embodiment is merely an illustration and the scope of the present disclosure is not to be interpreted in a limited sense. The scope of the present disclosure is defined by the appended claims, and all the modifications and changes which belong to the range of equivalents to the claims fall within the range of the present disclosure.

The present disclosure is useful for the compression ignition engine with the supercharger provided with the engine body having the cylinder where the combustion chamber is formed, the supercharger which boosts the intake air to the combustion chamber of the engine body, and the switch which switches between the first state in which the boosting of the intake air by the supercharger is enabled and the second state in which the boosting of the intake air by the supercharger is disabled.

DESCRIPTION OF REFERENCE CHARACTERS

1 Compression Ignition Engine with Supercharger
10 Engine Body
40 Intake Passage
44 Mechanical Supercharger
45 Electromagnetic Clutch
47 Bypass Passage
48 Air Bypass Valve
62 First Radiator
63 Flow Rate Control Valve (Fluid Temperature Adjuster)
81 Grille Shutter (Fluid Temperature Adjuster) (Air Amount Adjuster)
82 Radiator Fan (Fluid Temperature Adjuster) (Air Amount Adjuster)
91 Turbocharger
91a Turbine
91b Compressor
92 Turbine Bypass Passage
93 Waste Gate Valve
94 Compressor Bypass Passage
95 Compressor Bypass Valve
100 ECU (Controller)

What is claimed is:

1. A compression ignition engine with a supercharger, comprising:
an engine body having a cylinder where a combustion chamber is formed;
the supercharger, configured to boost intake air to the combustion chamber of the engine body;
one or more valves configured to switch a state between a first state in which the intake air is boosted by the supercharger and a second state in which the intake air is not boosted by the supercharger;
a fluid temperature adjuster comprising a grille shutter provided in front of a radiator and configured to adjust a temperature of engine coolant configured to be supplied to the radiator from the engine body to cool the engine body, the grille shutter comprising a plurality of flappers which rotate on respective axes extending in a vehicle width direction; and
a controller comprised of circuitry, configured to control operation of the engine body including operations of the one or more valves and the fluid temperature adjuster,
wherein when the controller determines that an operating state of the engine body is in a high-load operating range where an engine load is more than a given load, the controller controls a combustion mode of the engine body to be in a compression ignition combustion mode in which an unburnt mixture gas is self-ignited during flame propagation combustion of a mixture gas caused by jump-spark ignition inside the combustion chamber,
wherein when the controller determines that the operating state of the engine body is in the high-load operating range, causing the one or more valves to be in the first state, while when the operating state of the engine body is in a low-load operating range in which the load is lower than the given load, causing the one or more valves to be in the second state,
wherein when the controller determines that the operating state of the engine body is in the high-load operating range, the controller outputs a control signal to the grille shutter so that an opening of the grille shutter becomes larger, compared with the opening of the grille shutter when the operating state of the engine body is in the low-load operating range,
wherein the fluid temperature adjuster comprises the grille shutter and a radiator fan configured to adjust an amount of air passing through the radiator, the radiator fan provided rearward of the radiator,
wherein when the operating state of the engine body is in the high-load operating range, the controller increases a rotational speed of the radiator fan, compared with the rotational speed of the radiator fan when the operating state of the engine body is in the low-load operating range, and
wherein the controller controls the grille shutter and the radiator fan such that:
a detection result of a fluid temperature sensor becomes a first fluid temperature when the operating state of the engine body is in a low-speed operating range and in the low-load operating range, and
the opening of the grille shutter is fully closed and the rotational speed of the radiator fan is set to zero when the detection result of the fluid temperature sensor is below the first fluid temperature.

2. The compression ignition engine of claim 1, wherein the supercharger is a mechanical supercharger disposed in an intake passage connected to the engine body.

3. The compression ignition engine of claim 2, wherein the intake passage is provided with a bypass passage bypassing the mechanical supercharger, and
wherein the compression ignition engine further includes a clutch configured to intercept and permit transmission of a driving force to the mechanical supercharger, and the one or more valves include an air bypass valve configured to open and close the bypass passage.

4. The compression ignition engine of claim 1, wherein the supercharger is a turbocharger having a turbine disposed in an exhaust passage connected to the engine body, and a compressor disposed in an intake passage connected to the engine body and configured to be driven by the turbine.

5. The compression ignition engine of claim 4, wherein the exhaust passage is provided with a turbine bypass passage bypassing the turbine, and the intake passage is provided with a compressor bypass passage bypassing the compressor, and
wherein the one or more valves include a waste gate valve configured to open and close the turbine bypass passage, and a compressor bypass valve configured to open and close the compressor bypass passage.

6. The compression ignition engine of claim 1, wherein the controller controls the grille shutter such that an angle at an acute angle side of the flappers with respect to a vertical direction of the grille shutter is adjusted to be in a range below 30° to thereby maintain the temperature of the engine coolant above the first fluid temperature, when the operating state of the engine body is in the low-speed operating range and in the low-load operating range.

7. The compression ignition engine of claim 1,
wherein the controller controls the grille shutter and the radiator fan such that the grille shutter is opened and the radiator fan is started when the operating state of the engine body is in a high-speed operating range and in the low-load operating range, even when the detection result of the fluid temperature sensor is below the first fluid temperature, and the opening of the grille shutter and the rotational speed of the radiator fan are controlled so that the detection result of the fluid temperature sensor is below the first fluid temperature and above a second fluid temperature.

8. The compression ignition engine of claim 7,
wherein the controller controls the grille shutter such that an angle at an acute angle side of the flappers with respect to a vertical direction of the grille shutter is adjusted to be in a range above 30° and below 60° when the operating state of the engine body is in the high-speed operating range and in the low-load operating range.

9. The compression ignition engine of claim 1,
wherein the controller controls the grille shutter and the radiator fan such that the grille shutter is opened and the radiator fan is started when the operating state of the engine body is in the high-load operating range, even when the detection result of the fluid temperature sensor is below the first fluid temperature, and the opening of the grille shutter and the rotational speed of the radiator fan are controlled so that the detection result of the fluid temperature sensor becomes a second fluid temperature.

10. The compression ignition engine of claim 9,
wherein the controller controls the grille shutter such that an angle at an acute angle side of the flappers with respect to a vertical direction of the grille shutter is adjusted to be in a range above 60° and below 90° when the operating state of the engine body is in the high-load operating range.

* * * * *